(12) United States Patent
Sugaya

(10) Patent No.: US 12,082,175 B2
(45) Date of Patent: Sep. 3, 2024

(54) WIRELESS COMMUNICATION DEVICE AND METHOD

(71) Applicant: Sony Group Corporation, Tokyo (JP)

(72) Inventor: Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 369 days.

(21) Appl. No.: 17/603,600

(22) PCT Filed: Apr. 9, 2020

(86) PCT No.: PCT/JP2020/016003
§ 371 (c)(1),
(2) Date: Oct. 14, 2021

(87) PCT Pub. No.: WO2020/218016
PCT Pub. Date: Oct. 29, 2020

(65) Prior Publication Data
US 2022/0217721 A1    Jul. 7, 2022

(30) Foreign Application Priority Data
Apr. 22, 2019  (JP) .................. 2019-081245

(51) Int. Cl.
*H04W 28/06* (2009.01)
*H04L 5/00* (2006.01)
(Continued)

(52) U.S. Cl.
CPC ....... *H04W 72/0453* (2013.01); *H04L 5/0053* (2013.01); *H04L 47/34* (2013.01); *H04W 28/06* (2013.01)

(58) Field of Classification Search
CPC .......... H04W 72/0453; H04W 28/06; H04L 5/0053; H04L 47/34
See application file for complete search history.

(56) References Cited

U.S. PATENT DOCUMENTS

| 10,057,747 B2 | 8/2018 | Alpert |
| 2005/0195858 A1* | 9/2005 | Nishibayashi ........ H04L 1/1614 370/474 |

(Continued)

FOREIGN PATENT DOCUMENTS

| JP | 2010-135909 A | 6/2010 |
| JP | 2010135909 A * | 6/2010 |

(Continued)

OTHER PUBLICATIONS

International Search Report and Written Opinion mailed on Jul. 7, 2020, received for PCT Application PCT/JP2020/016003, Filed on Apr. 9, 2020, 8 pages including English Translation.

*Primary Examiner* — Derrick V Rose
(74) *Attorney, Agent, or Firm* — XSENSUS LLP

(57) ABSTRACT

The present technology relates to a wireless communication device and method that enable efficient data retransmission in communication using a plurality of frequency bands.

A wireless communication device sets a series of sequence numbers to data to be transmitted to one transmission destination through a plurality of frequency bands, transmits the data through the plurality of frequency bands, and causes reception of receipt acknowledgment information through the frequency band in which the transmission of the data has been completed first among the plurality of frequency bands, the receipt acknowledgment information indicating a receipt acknowledgment regarding the data transmitted through the plurality of frequency bands. The present technology can be applied to a wireless communication system.

13 Claims, 17 Drawing Sheets

(51) Int. Cl.
   *H04L 47/34*     (2022.01)
   *H04W 72/0453*   (2023.01)

(56) References Cited

U.S. PATENT DOCUMENTS

| | | | |
|---|---|---|---|
| 2017/0289844 A1* | 10/2017 | Son | H04L 1/1614 |
| 2018/0184233 A1 | 6/2018 | Alpert | |
| 2018/0205502 A1 | 7/2018 | Merlin et al. | |
| 2019/0082373 A1 | 3/2019 | Patil | |

FOREIGN PATENT DOCUMENTS

| | | |
|---|---|---|
| JP | 2017-139595 A | 8/2017 |
| JP | 2019527502 A | 9/2019 |
| WO | 2016/088726 A1 | 6/2016 |
| WO | WO-2018008237 A1 | 1/2018 |
| WO | WO-2018009012 A1 | 1/2018 |

\* cited by examiner

*FIG. 13*

| Element ID | Length | Priority Sequence Information Element | ... | FCS |
|---|---|---|---|---|
| | | Priority Type | Operation Band | Transmit Back-off Time | Sequence No. Management | A-MPDU Max Length | | |

WIRELESS COMMUNICATION DEVICE AND METHOD

CROSS-REFERENCE TO RELATED APPLICATIONS

The present application is based on PCT filing PCT/JP2020/016003, filed Apr. 9, 2020, which claims priority to JP 2019-081245, filed Apr. 22, 2019, the entire contents of each are incorporated herein by reference.

TECHNICAL FIELD

The present technology relates to a wireless communication device and method, and more particularly, to a wireless communication device and method that enable efficient data retransmission in communication using a plurality of frequency bands.

BACKGROUND ART

As a carrier aggregation technology or a channel bonding technology, there has been a technology for transmitting data using a plurality of frequency bands (bands). In that field, access control is performed on each frequency band, so that a series of data transmission can be performed.

First, which data should be transmitted through which frequency band is determined prior to data transmission. After the frequency band through which transmission is to be performed is determined, data is stored into the transmission buffers of the respective frequency bands through the respective frequency bands, and sequence numbers are set and managed for each frequency band (see Patent Document 1).

As a result, a receipt acknowledgement is sent through the frequency bands after the data transmission, and thus, the conventional access control technology can be used as it is.

CITATION LIST

Patent Document

Patent Document 1: Japanese Patent Application Laid-Open No. 2017-139595

SUMMARY OF THE INVENTION

Problems to be Solved by the Invention

As the amount of data transmission has increased these days, the amount of information that is used by applications has also increased, and a technology for transferring data using a plurality of frequency bands in combination is now being used.

By the technology described above, however, the sequence numbers are set and managed for each frequency band. Therefore, in a case where the radio wave propagation environment deteriorates in a specific frequency band, for example, it is difficult to receive a receipt acknowledgement and perform data retransmission using some other frequency band.

The present technology has been made in view of such circumstances, and is to enable efficient data retransmission in communication using a plurality of frequency bands.

Solutions to Problems

A wireless communication device according to one aspect of the present technology includes: a sequence management unit that sets a series of sequence numbers to data to be transmitted to one transmission destination through a plurality of frequency bands; a wireless transmission unit that transmits the data through the plurality of frequency bands; and a communication control unit that causes reception of receipt acknowledgment information through the frequency band in which the transmission of the data has been completed first among the plurality of frequency bands, the receipt acknowledgment information indicating a receipt acknowledgment regarding the data transmitted through the plurality of frequency bands.

A wireless communication device according to another aspect of the present technology includes: a wireless reception unit that receives data transmitted to one transmission destination through a plurality of frequency bands; a sequence management unit that manages a series of sequence numbers that have been set to the data received through the plurality of frequency bands; and a communication control unit that causes transmission of receipt acknowledgment information through the frequency band in which the reception of the data has been completed the earliest, the receipt acknowledgment information indicating a receipt acknowledgment regarding the data received through the plurality of frequency bands.

In one aspect of the present technology, a series of sequence numbers are set to the data to be transmitted to one transmission destination through a plurality of frequency bands, and the data is transmitted through the plurality of frequency bands. Receipt acknowledgment information indicating a receipt acknowledgment regarding the data transmitted through the plurality of frequency bands is received through the frequency band in which the transmission of the data has been completed first among the plurality of frequency bands.

In another aspect of the present technology, data transmitted to one transmission destination through a plurality of frequency bands is received, and a series of sequence numbers set to the data received through the plurality of frequency bands are managed. Receipt acknowledgment information indicating a receipt acknowledgment regarding the data received through the plurality of frequency bands is transmitted through the frequency band in which the reception of the data has been completed the earliest.

BRIEF DESCRIPTION OF DRAWINGS

FIG. 13 is a diagram showing an example configuration of a priority sequence information element.

MODES FOR CARRYING OUT THE INVENTION

Figure 1:
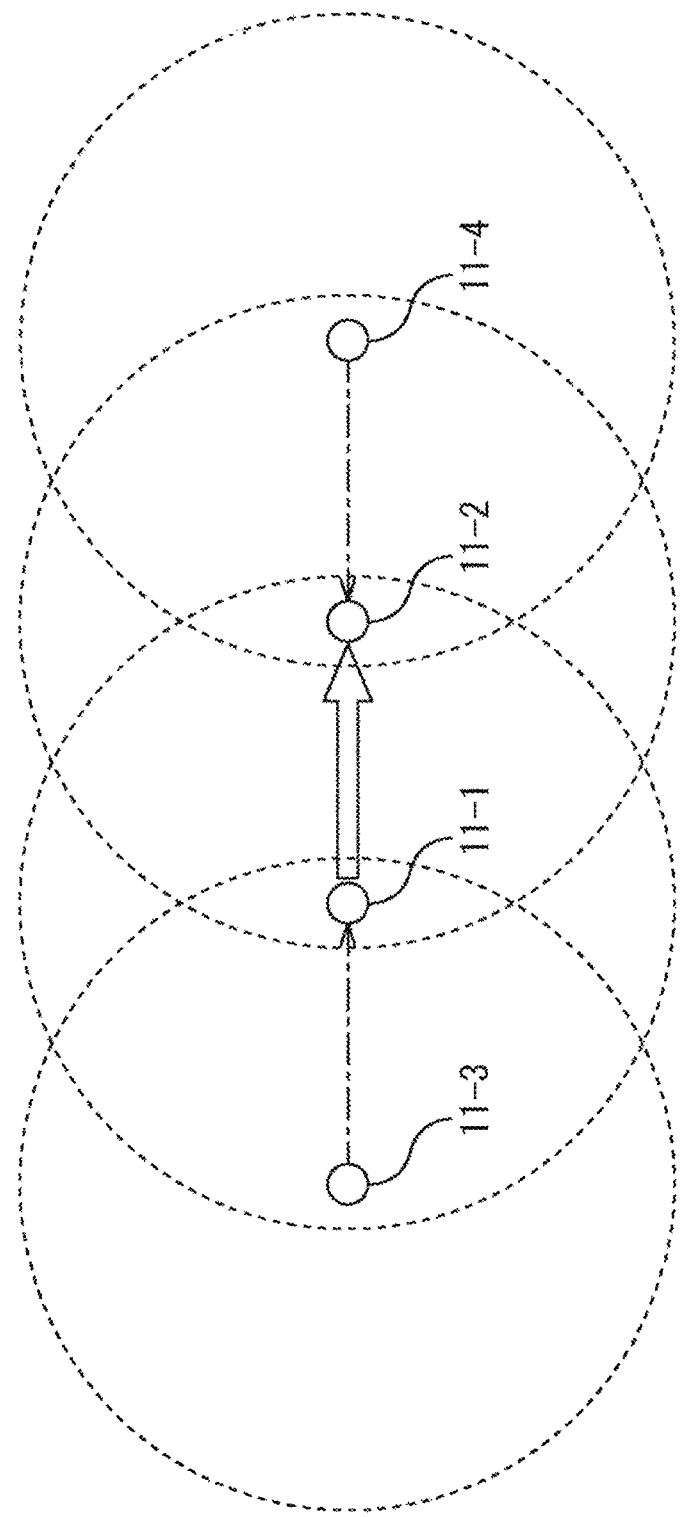
FIG. 1 is a diagram showing an example configuration of a wireless communication system according to an embodiment of the present technology.

The following is a description of modes for carrying out the present technology. Explanation will be made in the following order.

1. Wireless communication system
2. Configuration of a communication device
3. Operation of the wireless communication system
4. Frame configurations
5. Operations of communication devices
6. Other aspects

1. Wireless Communication System

<Configuration of a Wireless Communication System>

FIG. 1 is a diagram showing an example configuration of a wireless communication system according to an embodiment of the present technology.

The wireless communication system in FIG. 1 includes communication devices 11-1 to 11-4. The communication devices 11-1 to 11-4 are formed with smartphones, portable telephones, mobile terminals, personal computers, or the like. Note that, in a case where there is no particular need to distinguish the communication devices 11-1 to 11-4 from one another, the communication devices 11-1 to 11-4 will be referred to as the communication devices 11 in the description below.

In FIG. 1, circles with broken lines centered around circles representing the respective communication devices 11-1 to 11-4 indicate the effective wireless communication ranges of the respective communication devices 11-1 to 11-4.

The communication devices 11-2 and 11-3 exist in the effective wireless communication range of the communication device 11-1. The communication device 11-1 can transmit and receive data to and from at least one of the communication devices 11-2 and 11-3 by wireless communication.

The communication devices 11-1 and 11-4 exist in the effective wireless communication range of the communication device 11-2. The communication device 11-2 can transmit and receive data to and from at least one of the communication devices 11-1 and 11-4 by wireless communication.

As indicated by a thick arrow, the communication device 11-1 transmits data through a plurality of frequency bands to the communication device 11-2 existing in the effective wireless communication range thereof. At that time, the communication device 11-1 sets a series of sequence numbers to the data to be transmitted through the plurality of frequency bands to the communication device 11-2 that is a transmission destination. The communication device 11-1 also causes reception of a block ACK that is an acknowledgment of receipt of the data transmitted through the plurality of frequency bands, through the frequency band in which the data transmission has been completed first.

The communication device 11-2 receives the data transmitted to one transmission destination through the plurality of frequency bands. The communication device 11-2 then manages the series of sequence numbers set for the data received through the plurality of frequency bands, and transmits the block ACK that is an acknowledgement of receipt of the data received through the plurality of frequency bands, through the frequency band in which the data reception has been completed first.

In this manner, receipt of data can be efficiently acknowledged in communication using a plurality of frequency bands. Thus, data retransmission can be efficiently performed.

<Outline of Conventional Technologies>

Meanwhile, as the amount of data transmission has increased these days, the amount of information that is used by applications has also increased, and a technology for transmitting data using a plurality of frequency bands in combination is now being used.

Among wireless communication standards compliant with IEEE 802.11 as a wireless LAN system, standards using a 2.4 GHz band, a 5 GHz band, a 920 MHz band, and a 60 GHz band are defined, and it is possible to transmit data by simultaneously operating a plurality of these frequency bands.

In a case where a plurality of pieces of data is transmitted through a plurality of frequency bands, the frequency bands are operated independently of one another. Therefore, the sequence numbers are managed independently for each frequency band, and a receipt acknowledgment is also recognized only with the sequence numbers.

As a result, a sequence number that has been set once is confused with a sequence number for another frequency band, and therefore, the frequency bands need to be closed when an acknowledgement of receipt of these pieces of data is transmitted.

Further, by an access control method according to Enhanced Distributed Channel Access (EDCA) defined in the IEEE 802.11 standard specification, a technology has been used for setting differences in transmission standby time, and preferentially transmitting data having the higher priority levels, in accordance with the type and the attribute information (Access Category (AC)) of the data to be transmitted. By EDCA, a sequence number is also set for each Transmit Identifier (TID).

<Configurations of Conventional Transmission Buffers>

Figure 2:
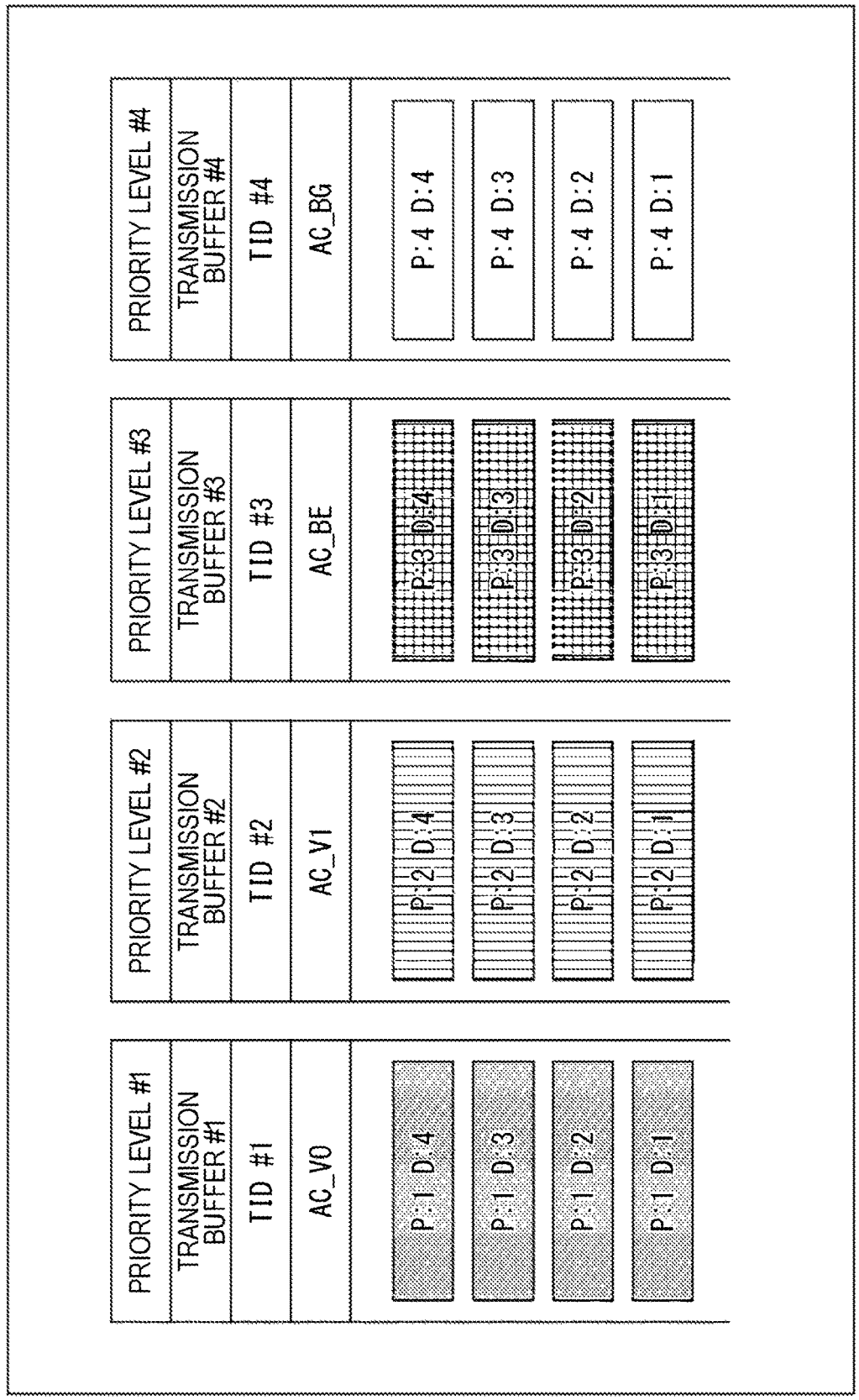
FIG. 2 is a diagram showing the configurations of conventional transmission buffers.

FIG. 2 is a diagram showing the configurations of conventional transmission buffers.

In the case of FIG. 2, a transmission buffer is formed for each priority level, and the transmission buffer at each priority level stores data as described below, according to the categories defined in EDCA mentioned above. The categories include Voice, Video, Best Effort, and Back Ground in descending order of priority levels.

Note that, although FIG. 2 shows an example in which the transmission buffers are formed in accordance with four priority levels for convenience, the number of priority levels may be five or larger, or may be three or smaller.

A transmission buffer #1 of a priority level #1 has TID #1 allotted as the TID, and stores data (AC VO (Voice)) of Voice, which is a category with the highest priority level. In the data stored in the transmission buffer #1, sequence numbers P:1 D:1, P:1 D:2, P:1 D:3, and P:1 D:4 are sequentially set as TID #1. Note that P:1 D:1 represents Data with the first data order and the first Priority (priority level).

A transmission buffer #2 of a priority level #2 has TID #2 allotted as the TID, and stores video data (AC VI (Video)) of Video, which is a category with the second highest priority level. In the data stored in the transmission buffer #2, sequence numbers P:2 D:1, P:2 D:2, P:2 D:3, and P:2 D:4 are sequentially set as TID #2.

A transmission buffer #3 of a priority level #3 has TID #3 allotted as the TID, and stores data (AC BE (Best Effort)) of Best Effort, which is a category with the second lowest priority level. In the data stored in the transmission buffer #3, sequence numbers P:3 D:1, P:3 D:2, P:3 D:3, and P:3 D:4 are sequentially set as TID #3.

A transmission buffer #4 of a priority level #4 has TID #4 allotted as the TID, and stores data (AC BG (Back Ground)) of Back Ground, which is a category with the lowest priority level. In the data stored in the transmission buffer #4, sequence numbers P:4 D:1, P:4 D:2, P:4 D:3, and P:4 D:4 are sequentially set as TID #4.

Since sequence numbers are set for each TID, the same sequence number exists for each TID in a case where retransmission control is performed in a plurality of frequency bands. Further, in a case where a block ACK indicating an acknowledgment of data receipt is requested, for example, there is the need to set a bitmap for each TID. Since sequence numbers are set for each TID in conventional cases as described above, sequence management is complicated in a case where these pieces of data are transmitted through a plurality of frequency bands.

<Conventional Transmission Sequence>

Figure 3:
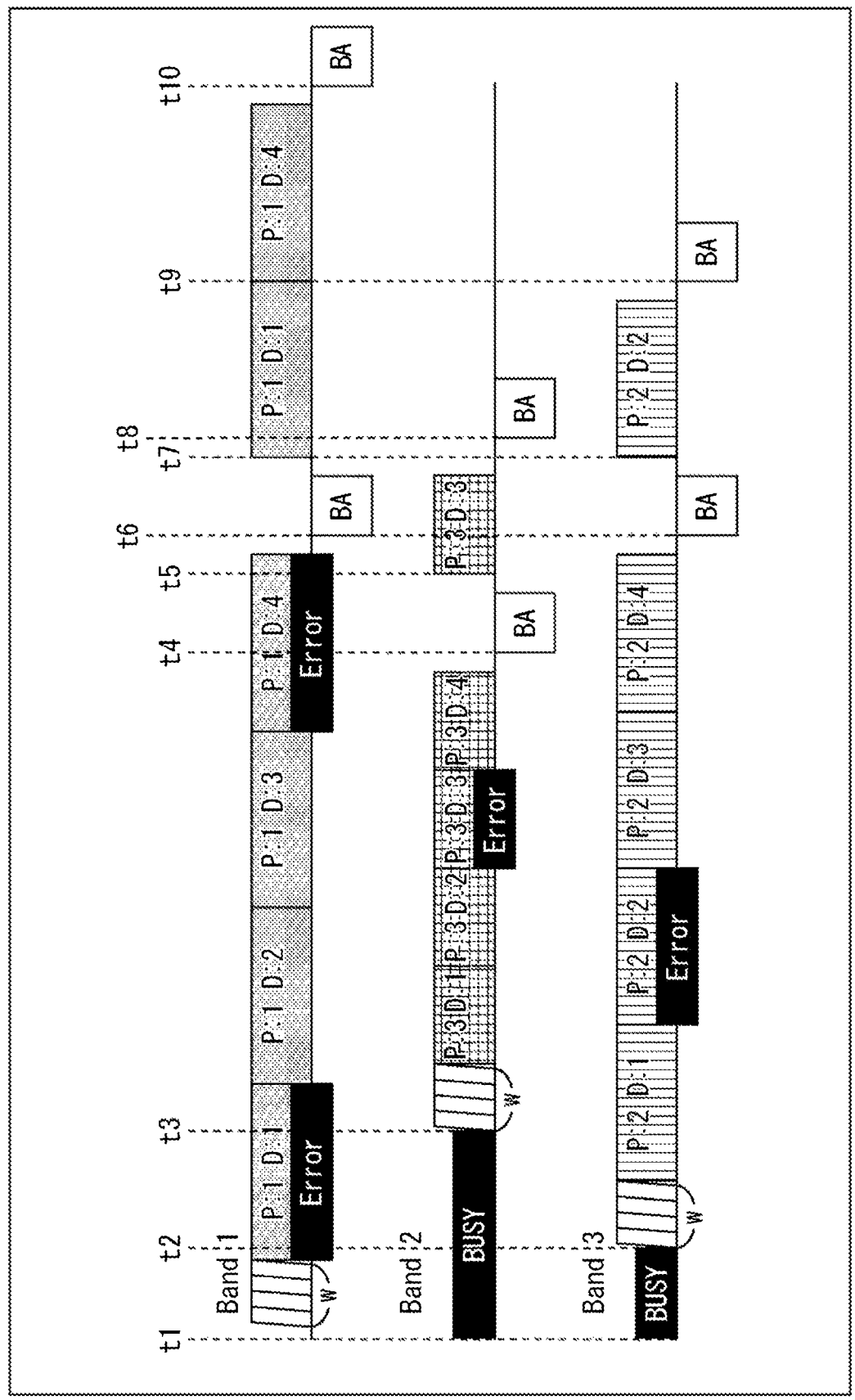
FIG. 3 is a diagram showing a sequence of conventional data transmission.

FIG. 3 is a diagram showing a conventional transmission sequence.

FIG. 3 shows a transmission sequence in each of the frequency bands of Band 1, Band 2, and Band 3 in this order from the top. In this transmission sequence, priority levels based on conventional sequence numbers are used. Data transmitted from a communication device on the transmission side is shown above the line indicating the sequence in each frequency band. Data transmitted from a communication device on the reception side is shown below the line indicating the sequence in each frequency band. The abscissa axis direction indicates the flow of operation over time.

Note that, although FIG. 3 shows an example in which three frequency bands (Bands) are used, the number of frequency bands to be used may be four or larger, or may be two or smaller.

In the communication device on the transmission side, data is buffered according to the priority levels shown in FIG. 2. At time t1, Band 1 becomes available. In a case where any signal from another communication device has not been detected during a predetermined transmission standby time w in Band 1, an access right is acquired, and the communication device on the transmission side transmits first data (P:1 D:1) of the highest priority level at time t1+w through Band 1.

After that, the communication device on the transmission side transmits data of the same priority level as (P:1 D:1) in the order of (P:1 D:2, P:1 D:3, and P:1 D:4) through Band 1, which is the frequency band that has become available first. P:1 D:1 to P:1 D:4 are an aggregation MAC protocol data unit (A-MPDU) that is aggregated and includes the respective MAC protocol data units (MPDUs) of P:1 D:1, P:1 D:2, P:1 D:3, and P:1 D:4. Note that the respective MPDUs of P:1 D:1, P:1 D:2, P:1 D:3, and P:1 D:4 are the respective data pieces of a data group of the same priority level.

Next, at time t2, Band 3 becomes available. In a case where any signal from another communication device has not been detected during the predetermined transmission standby time w in Band 3, an access right is acquired, and the communication device on the transmission side transmits first data (P:2 D:1) of the second highest priority level at time t2+w through Band 3.

After that, the communication device on the transmission side transmits data of the same priority level as (P:2 D:1) in the order of (P:2 D:2, P:2 D:3, and P:2 D:4) through Band 3, which is the frequency band that has become available second.

Further, at time t3, Band 2 becomes available. In a case where any signal from another communication device has not been detected during the predetermined transmission standby time w in Band 2, an access right is acquired, and the communication device on the transmission side transmits first data (P:3 D:1) of the low priority level at time t3+w through Band 2.

After that, the communication device on the transmission side transmits data of the same priority level as (P:3 D:1) in the order of (P:3 D:2, P:3 D:3, and P:3 D:4) through Band 2, which is the frequency band that has become available third.

Here, regarding the end time of data transmission, in Band 2, which is a frequency band for transmission at a high transmission rate (MCS), the data transmission is ended earlier than in Band 1 and Band 3, which are the other frequency bands, though the transmission was started the latest in Band 2, as shown in FIG. 3.

As described above, not only the transmission start time varies, but also the available transmission rate (MCS) varies depending on the states of the transmission paths in the respective frequency bands, and each data piece is formed with a variable length. Therefore, the end time of data transmission is not always the same.

Further, in FIG. 3, Error seen in some pieces of data to be transmitted indicates that an error has occurred at the time of reception in the communication device on the reception side, and the data has not been correctly received. In Band 1, the first and last data (P:1 D:1, and P:1 D:4) have not been correctly received. In Band 2, intermediate data (P:3 D:3) has not been correctly received. In Band 3, intermediate data (P:2 D:2) has not been correctly received.

Further, the communication device on the reception side transmits a block ACK (BA), after data transmission through each frequency band. BA is information indicating an acknowledgment of data receipt by the communication device on the reception side. The communication device on the transmission side that has received the BA can retransmit the data that has not been received through each frequency band.

In other words, in a case where some of the transmitted data has been correctly received after the end of the data transmission through Band 2, which is the frequency band in which the data transmission has been completed the earliest, the communication device on the reception side transmits the BA at time t4. The communication device on the transmission side that has received the BA retransmits data (P:3 D:3) at time t5. In a case where the data retransmission has ended, and the retransmitted data has been correctly received, the communication device on the reception side transmits the BA through Band 2 at time t8.

Next, in a case where some of the transmitted data has been correctly received after the end of the data transmission through Band 1, which is a frequency band in which the data transmission has been completed, the communication device on the reception side transmits the BA at time t6. The communication device on the transmission side that has received the BA retransmits data (P:1 D:1) at time t7, and retransmits data (P:1 D:4) at time t9. In a case where the data retransmission has ended, and the retransmitted data has been correctly received, the communication device on the reception side transmits the BA through Band 1 at time t10.

In a case where some of the transmitted data has been correctly received after the end of the data transmission through Band 3, which is the frequency band in which the data transmission has been completed at the same timing as Band 1, the communication device on the reception side transmits the BA at time t6. The communication device on the transmission side that has received the BA retransmits data (P:2 D:2) at time t8. In a case where the data retransmission has ended, and the retransmitted data has been correctly received, the communication device on the reception side transmits the BA through Band 3 at time t9.

In the above manner, the sequence of the conventional data transmission is completed.

In the case of the data transmission sequence shown in FIG. 3, transmission of all the data is completed the earliest in Band 2, which is the frequency band in which transmission is started the latest, and transmission of data is completed the latest in Band 1, which is the frequency band in which transmission is started the earliest.

As described above, in a conventional case, a sequence number is set for each TID, and data is transmitted TID by TID in each frequency band. Therefore, in a case where the radio wave propagation environment deteriorates in a specific frequency band, it is difficult for the communication device on the transmission side to receive an acknowledgement of receipt and retransmit data using another frequency band.

That is, a sequence number is set for each TID, and data is transmitted TID by TID in each frequency band. Therefore, the communication device on the transmission side can retransmit data only through the frequency band in which the data has been once transmitted.

In a case where the radio wave propagation environment deteriorates in a specific frequency band, it is difficult for the communication device on the transmission side to receive an acknowledgement of receipt and retransmit data using another frequency band.

Therefore, even if the communication device on the transmission side transmits data having a high priority level through the frequency band that has acquired the access right first, it takes time to acknowledge receipt, and it takes a long time to complete retransmission.

Further, depending on the state of the transmission path in the frequency band that has become available for use and acquired the access right, an encoding method (MCS) with a low transmission rate is used, and it takes time for the communication device on the transmission side to complete data transmission.

That is, even if data is transmitted through the frequency band that become available first among a plurality of frequency bands, there is a possibility that data transmission through a frequency band that becomes available later will be completed earlier.

In such a case, it is possible to control the transmission standby time, but controlling the transmission standby time will hinder data transmission having priority levels set thereto. This is because, even though the user has set priority levels and stores data into a buffer, the order in which the data is eventually delivered to the reception side will change.

Therefore, in the present technology, a communication device sets a series of sequence numbers to data to be transmitted to one transmission destination through a plurality of frequency bands, transmits the data through the plurality of frequency bands, and causes reception of information through the frequency band in which the data transmission has been completed first, the information indicating an acknowledgment of receipt of the data transmitted through the plurality of frequency bands. As a result, in communication using a plurality of frequency bands, data receipt acknowledgement or data retransmission can be efficiently performed.

<Example of Sequence Number Setting According to the Present Technology>

Figure 4:
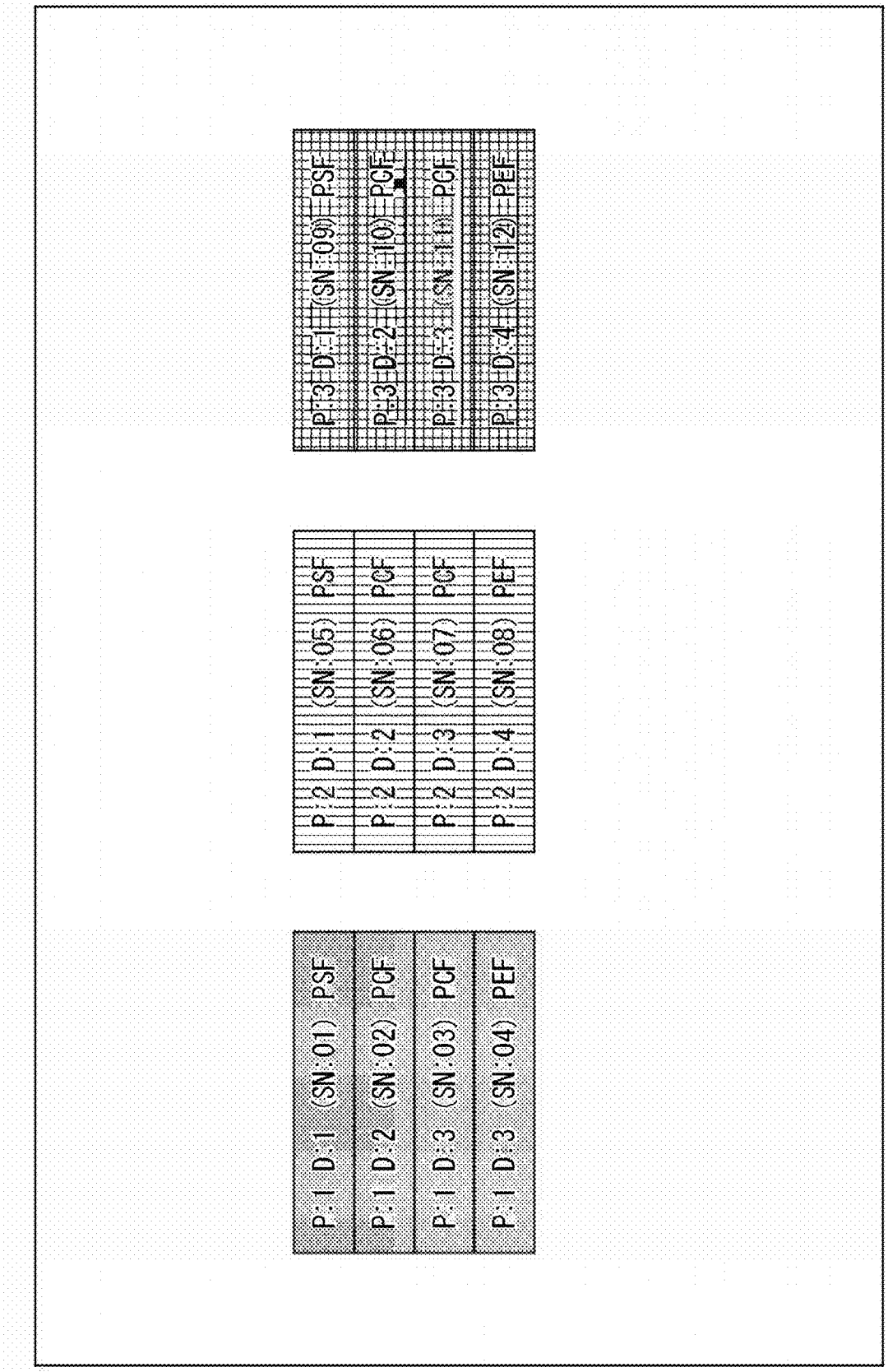
FIG. 4 is a diagram showing an example of sequence number setting to data by the wireless communication system.

FIG. 4 is a diagram showing an example of sequence number setting to data by the wireless communication system shown in FIG. 1.

FIG. 4 shows data to be buffered in the case of the wireless communication system in FIG. 1 among the transmission buffers #1 to #3 shown in FIG. 2. The explanations that have already been made will not be repeated below.

The wireless communication system in FIG. 1 allocates a series of sequence numbers (SN), starting from the data having the highest priority level among the data to be transmitted to one transmission destination.

For example, a series of sequence numbers are set, starting from the data P:1 having the highest priority level. Accordingly, SN:01 is set to P:1 D:1, SN:02 is set to P:1 D:2, SN:03 is set to P:1 D:3, and SN:04 is set to P:1 D:4.

Next, the series of sequence numbers continuing from the data P:1 are set to the data P:2 having the second highest priority level. Accordingly, SN:05 is set to P:2 D:1, SN:06 is set to P:2 D:2, SN:07 is set to P:2 D:3, and SN:08 is set to P:2 D:4.

Lastly, the series of sequence numbers continuing from the data P:1 and the data P:2 are set to the data P:3 having the third highest priority level.

Accordingly, SN:09 is set to P:3 D:1, SN:10 is set to P:3 D:2, SN:11 is set to P:3 D:3, and SN:12 is set to P:3 D:4.

Further, priority start frames (PSFs) are added to P:1 D:1, P:2 D:1, and P:3 D:1. A PSF is information indicating the first data among data having the same priority level. Priority center frames (PCFs) are added to P:1 D:2, P:2 D:2, P:3 D:2, P:1 D:3, P:2 D:3, and P:3 D:3. A PCF is information indicating the intermediate data among data having the same priority level.

Priority end frames (PEFs) are added to P:1 D:4, P:2 D:4, and P:3 D:4. A PEF is information indicating the last (delimiter) data among data having the same priority level. The PSFs, the PCFs, and the PEFs are information indicating the positions of the respective data pieces in the data group having the same priority level, or positional information about the data at the same priority level.

Note that, for the sake of convenience, FIG. 4 illustrates a state in which the data P:4 having the lowest priority level is not stored. However, in a case where the data P:4 is stored in the transmission buffer, a sequence number SN:13 and those that follow are set to the data P:4.

As described above, a communication device of the wireless communication system sets a series of sequence numbers for data to be transmitted to one transmission destination through a plurality of frequency bands, and performs centralized management. Accordingly, it is possible to acknowledge receipt of data transmitted through another frequency band. As a result, receipt through a plurality of frequency bands can be acknowledged at once, and thus, retransmission control can be simplified.

Further, a series of sequence numbers are set in accordance with the priority levels. Thus, it is possible to determine which priority level is higher, from the sequence numbers.

<Transmission Sequence According to the Present Technology>

Figure 5:
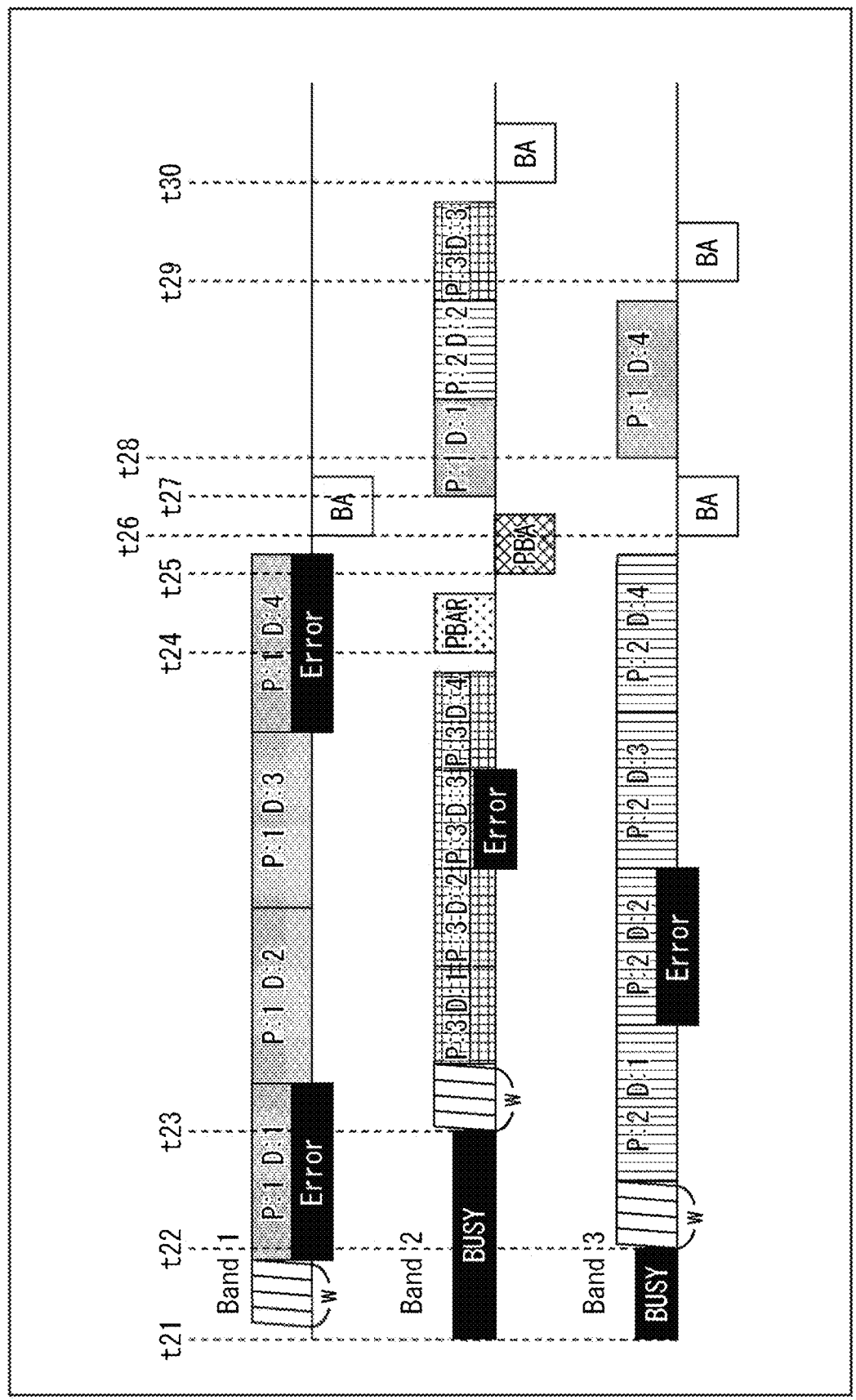
FIG. 5 is a chart showing a sequence of data transmission in the wireless communication system.

FIG. 5 is a diagram showing a transmission sequence according to the present technology.

The transmission sequence in FIG. 5 is a transmission sequence depending on priority levels using the series of sequence numbers of the present technology described above.

In FIG. 5, the sequence is basically similar to the sequence shown in FIG. 3, until the data transmission in Band 2 is completed the earliest. The explanations that have already been made will not be repeated below.

In the case shown in FIG. 5, up to the last (delimiter) data in a data group of the same priority level is transmitted through a frequency band that has become available. As a result, the respective MPDUs of P:1 D:1 to P:1 D:4 are transmitted as an aggregated A-MPDU through Band 1. The respective MPDUs of P:2 D:1 to P:2 D:4 are transmitted as an aggregated A-MPDU through Band 2. The respective MPDUs of P:3 D:1 to P:3 D:3 are transmitted as an aggregated A-MPDU through Band 3.

The communication device 11 on the transmission side transmits a block ACK request (BAR) of the present technology at time t24 after the end of the data transmission through Band 2, which is the frequency band in which the data transmission has been completed the earliest. A BAR is a frame for discriminating between data that has been successfully received and data that has not been successfully received at that point of time, and requesting a notification of a discrimination result to the data transmission source. Note that a BAR of the present technology will be hereinafter referred to as a priority block ACK request (Priority BAR: PBAR) to be distinguished from a conventional BAR.

A PBAR can include a request for returning block ACK information about the sequence numbers for data transmitted to one transmission destination through a plurality of frequency bands, for example. In this case, a block ACK for P:1 D:1, P:1 D:2, P:1 D:3, P:2 D:1, P:2 D:2, P:2 D:3, P:3 D:1, P:3 D:2, P:3 D:3, and P:3 D:4, excluding the data that is being transmitted or has not been transmitted yet, is required through PBAR transmission.

Alternatively, a PBAR can include a request for a return of block ACK information about that sequence numbers for all the data that is scheduled to be transmitted through all the frequency bands.

In this case, through PBAR transmission, a block ACK is requested for all of P:1 D:1 to P:1 D:4, P:2 D:1 to P:2 D:4, and P:3 D:1 to P:3 D:4, including untransmitted data that has not been transmitted. That is, through PBAR transmission, a request for the received data, the unreceived data, and a response to the unreceived data can be sent to the communication device 11 on the reception side.

In a case where a PBAR is received, the communication device 11 on the reception side transmits a block ACK of the present technology at time t25. Note that the block ACK of the present technology transmitted from the communication device 11 on the reception side in response to the PBAR will be hereinafter referred to as a priority block ACK (Priority BA:PBA) to be distinguished from a conventional block ACK. A PBA includes receipt acknowledgment information about the sequence numbers for all the data in all the frequency bands, for example.

According to the PBA of Band 2 transmitted from the communication device 11 on the reception side, P:1 D:2, P:1 D:3, P:2 D:1, P:3 D:1, P:3 D:2, P:3 D:3, and P:3 D:4 have been received, and the others are regarded as unreceived.

Receiving the PBA, the communication device 11 on the transmission side can recognize that the data that has been transmitted but has not reached is P:1 D:1, P:2 D:2, and P:3 D:3, and the data that has not been received or is being received is P:1 D:4 and P:2 D:4.

As a result, through Band 2 as a frequency band that has become available again, the communication device 11 on the transmission side can retransmit P:1 D:1, P:2 D:2, and P:3 D:3, which are the data that has not reached through any frequency band at that time. In the case shown in FIG. 5, retransmission of P:1 D:1, P:2 D:2, and P:3 D:3 is started through Band 2 at time t27, and, after the end of the retransmission, a BA of the retransmission data is transmitted from the reception side at time t30.

As for P:1 D:4 and P:2 D:4 that are the data being received, on the other hand, in a case where an error has occurred in the communication device 11 on the reception side or where reception is correctly completed, a BA is transmitted through each frequency band at time t26 immediately after that. As a result, the communication device 11 on the transmission side is notified of the data reception state. Thus, the communication device 11 on the transmission side can retransmit P:1 D:4, which had the error, through Band 3.

Although a BA is returned almost simultaneously through Band 1 and Band 3 in FIG. 5, Band 3 that is a frequency band unlikely to have transmission errors may be used for data retransmission.

In the above manner, the communication device 11 on the reception side can receive data starting from the highest priority level, in accordance with the priority levels intended by the transmission side.

<Another Data Transmission Sequence According to the Present Technology>

Figure 6:
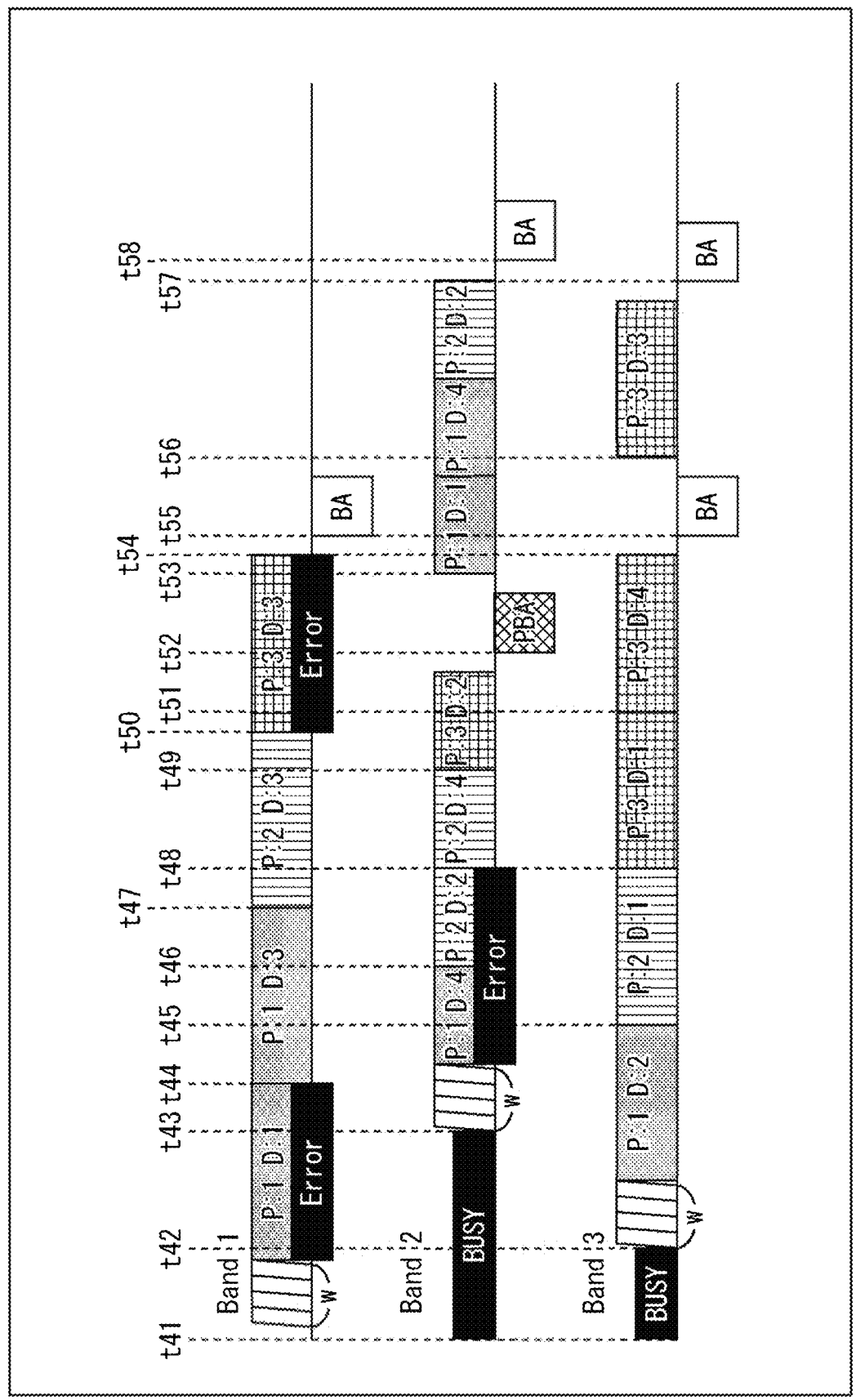
FIG. 6 is a chart showing another sequence of data transmission in the wireless communication system.

FIG. 6 is a diagram showing another data transmission sequence according to the present technology.

Like the transmission sequence in FIG. 5, the transmission sequence in FIG. 6 is a transmission sequence depending on priority levels using the series of sequence numbers of the present technology described above.

In FIG. 6, only transmission of the first P:1 D:1 is the same sequence as the sequence in FIG. 3. The explanations that have already been made will not be repeated below.

At time t41, Band 1 becomes available. In a case where any signal from another communication device has not been detected during a predetermined transmission standby time w in Band 1, an access right is acquired, and the communication device 11 on the transmission side transmits the first data (P:1 D:1) of the highest priority level at time t41+w through Band 1.

Next, at time t42, Band 3 becomes available. In a case where any signal from another communication device has not been detected during the predetermined transmission standby time w in Band 3, an access right is acquired, and the communication device 11 on the transmission side transmits the second data (P:1 D:2) of the highest priority level at time t42+w through Band 3.

At time t44, which is the point of time when the transmission of the first data (P:1 D:1) through Band 1 is completed, the communication device 11 on the transmission side transmits the third data (P:1 D:3) of the highest priority level through Band 1.

At time t43, Band 2 becomes available. In a case where any signal from another communication device has not been detected during the predetermined transmission standby time w in Band 2, an access right is acquired, and the communication device 11 on the transmission side transmits the fourth data (P:1 D:4) of the highest priority level at time t43+w through Band 2.

At time t45, which is the point of time when the transmission of the first data (P:1 D:2) through Band 3 is completed, the communication device 11 on the transmission side transmits the first data (P:2 D:1) of the second highest priority level through Band 3.

At time t46, which is the point of time when the transmission of the first data (P:1 D:4) through Band 2 is completed, the communication device 11 on the transmission side transmits the second data (P:2 D:2) of the second highest priority level through Band 2.

At time t47, which is the point of time when the transmission of the second data (P:1 D:3) through Band 1 is completed, the communication device 11 on the transmission side transmits the third data (P:2 D:3) of the second highest priority level through Band 1.

At time t48, which is the point of time when the transmission of the second data (P:2 D:2) through Band 2 is completed, the communication device 11 on the transmission side transmits the fourth data (P:2 D:4) of the second highest priority level through Band 2.

At time t48, which is the point of time when the transmission of the second data (P:2 D:1) through Band 3 is completed, the communication device 11 on the transmission side transmits the first data (P:3 D:1) of the third highest priority level through Band 3.

At time t49, which is the point of time when the transmission of the third data (P:2 D:4) through Band 2 is completed, the communication device 11 on the transmission side transmits the second data (P:3 D:2) of the third highest priority level through Band 2.

At time t50, which is the point of time when the transmission of the third data (P:2 D:3) through Band 1 is completed, the communication device 11 on the transmission side transmits the third data (P:3 D:3) of the third highest priority level through Band 1.

Lastly, at time t51, which is the point of time when the transmission of the third data (P:3 D:1) through Band 3 is completed, the communication device 11 on the transmission side transmits the fourth data (P:3 D:4) of the third highest priority level through Band 3.

As untransmitted data of higher priority levels is sequentially transmitted through a frequency band that has become available in the above manner, the respective MPDUs of P:1 D:1, P:1 D:3, P:2 D:3, and P:3 D:3 are transmitted as an aggregated A-MPDU through Band 1 in the case shown in FIG. 6. The respective MPDUs of P:1 D:4, P:2 D:2, P:2 D:4, and P:3 D:2 are transmitted as an aggregated A-MPDU through Band 2. The respective MPDUs of P:1 D:2, P:2 D:1, P:3 D:1, and P:3 D:4 are transmitted as an aggregated A-MPDUs through Band 3. Although each four MPDUs are aggregated herein, a padding may be added to an A-MPDU as necessary in a case where its size is smaller than a predetermined size.

Meanwhile, the communication device 11 on the reception side transmits a PBA at time t52 after the end of data transmission through Band 2, which is the frequency band in which the data transmission has been completed the earliest. A PBA includes receipt acknowledgment information about the sequence numbers for all the data in all the frequency bands, for example.

In the case shown in FIG. 6, a PBA includes received data and unreceived data, and a response to the unreceived data, regarding that a block ACK is requested for all of P:1 D:1 to P:1 D:4, P:2 D:1 to P:2 D:4, and P:3 D:1 to P:3 D:4, including data that has not been transmitted.

According to the priority block ACK (PBA) of Band 2 transmitted at time t52, P:1 D:2, P:1 D:3, P:2 D:1, P:2 D:3, P:2 D:4, P:3 D:1, and P:3 D:2 have been received, and the others are regarded as unreceived.

Receiving the PBA, the communication device 11 on the transmission side can recognize that the data that has been transmitted but has not reached is P:1 D:1, P:1 D:4, and P:2 D:2, and the data that has not been received or is being received is P:3 D:3 and P:3 D:4.

After that, P:1 D:1, P:1 D:4, and P:2 D:2, which are data that has not reached at that time, can be retransmitted through Band 2, which is a frequency band that has become available again. At this point of time, the respective MPDUs of P:1 D:1, P:1 D:4, and P:2 D:2 are transmitted as an aggregated A-MPDU through Band 2. In FIG. 6, at time t53, the communication device 11 on the transmission side starts retransmission of P:1 D:1, P:1 D:4, and P:2 D:2. At time t58 after the end of the retransmission, the communication device 11 on the reception side transmits a BA for the retransmitted data.

As for P:3 D:3 and P:3 D:4 that are the data being received, on the other hand, in a case where an error has occurred in the communication device 11 on the reception side or where reception is correctly completed, a BA is transmitted to the transmission side at time t55 immediately after that. As a result, the communication device 11 on the transmission side is notified of the data reception state. Thus, the communication device 11 on the transmission side can retransmit P:1 D:4, which had the error, through Band 3.

Although a BA is returned almost simultaneously through Band 1 and Band 3 at time t55 in FIG. 6, Band 3 that is a frequency band unlikely to have transmission errors may be used at time t56 for retransmitting P:3 D:3 that has become an error. At time t57 after the end of the retransmission, the communication device 11 on the reception side transmits a BA for the retransmitted data.

In the above manner, the communication device 11 on the reception side can receive data starting from the highest priority level, in accordance with the priority levels intended by the transmission side.

Note that, in the transmission sequences shown in FIGS. 5 and 6, examples in which a BA is transmitted in the case of an acknowledgement of retransmission receipt have been described. However, a PBA may be transmitted in the case of an acknowledgement of retransmission receipt.

Further, the transmission sequences in FIGS. 5 and 6 will be hereinafter also referred to as priority sequences (Priority Sequences) of the present technology.

2. Configuration of a Communication Device

Figure 7:
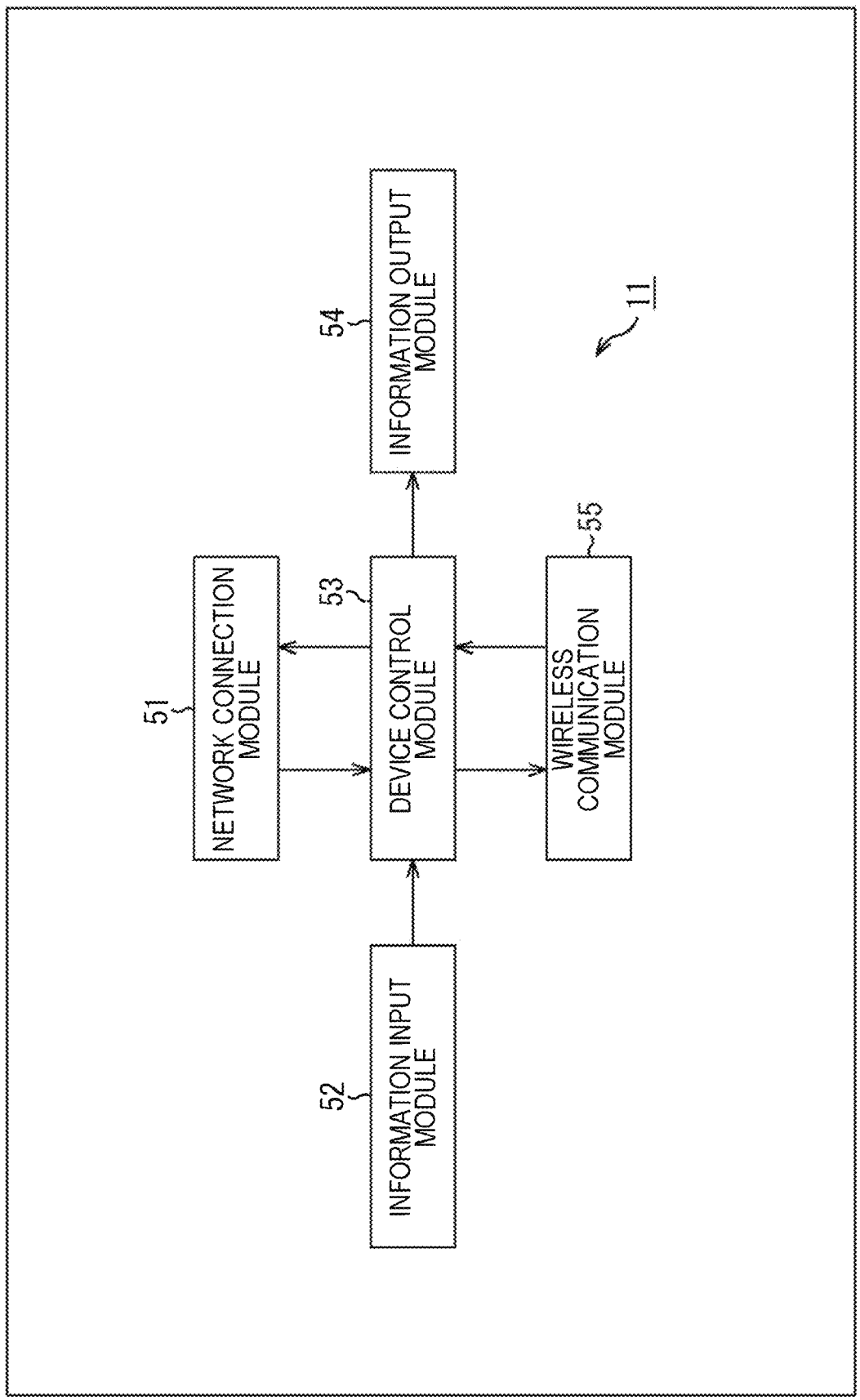
FIG. 7 is a block diagram showing an example configuration of a communication device.

<Configuration of a Communication Device>
FIG. 7 is a block diagram showing an example configuration of a communication device 11.

The communication device 11 in FIG. 7 includes a network connection module 51, an information input module 52, a device control module 53, an information output module 54, and a wireless communication module 55.

The network connection module 51 is designed to implement the functions of a communication modem or the like for connecting to the Internet network in a case where it operates as a device at an access point, under the control of the device control module 53. The network connection module 51 performs connection between a public communication channel and the Internet via an Internet service provider.

The information input module 52 outputs information indicating an instruction that is input by the user, to the device control module 53. The information input module 52 includes push buttons, a keyboard, a touch panel, or the like.

The device control module 53 includes a central processing unit (CPU), a read only memory (ROM), and a random access memory (RAM). The device control module 53 executes a program stored in the ROM or the like, causes an application to function in a higher layer, and performs control to cause each component of the communication device 11 intended by the user to operate as a communication device or a device at an access point.

The information output module 54 outputs information that is supplied from the device control module 53 and relates to the operating state of the communication device 11, or information obtained via the Internet. The information output module 54 includes a display element such as an LED, a liquid crystal panel, or an organic display, or a speaker or the like that outputs sound or music. The information output module 54 performs display and notification of information required for the user.

The wireless communication module 55 performs wireless communication, to transmit data supplied from the device control module 53 to another communication device 11. The wireless communication module 55 performs wireless communication, to receive data transmitted from another communication device 11, and output the received data to the device control module 53.

<Configuration of the Wireless Communication Module>

Figure 8:
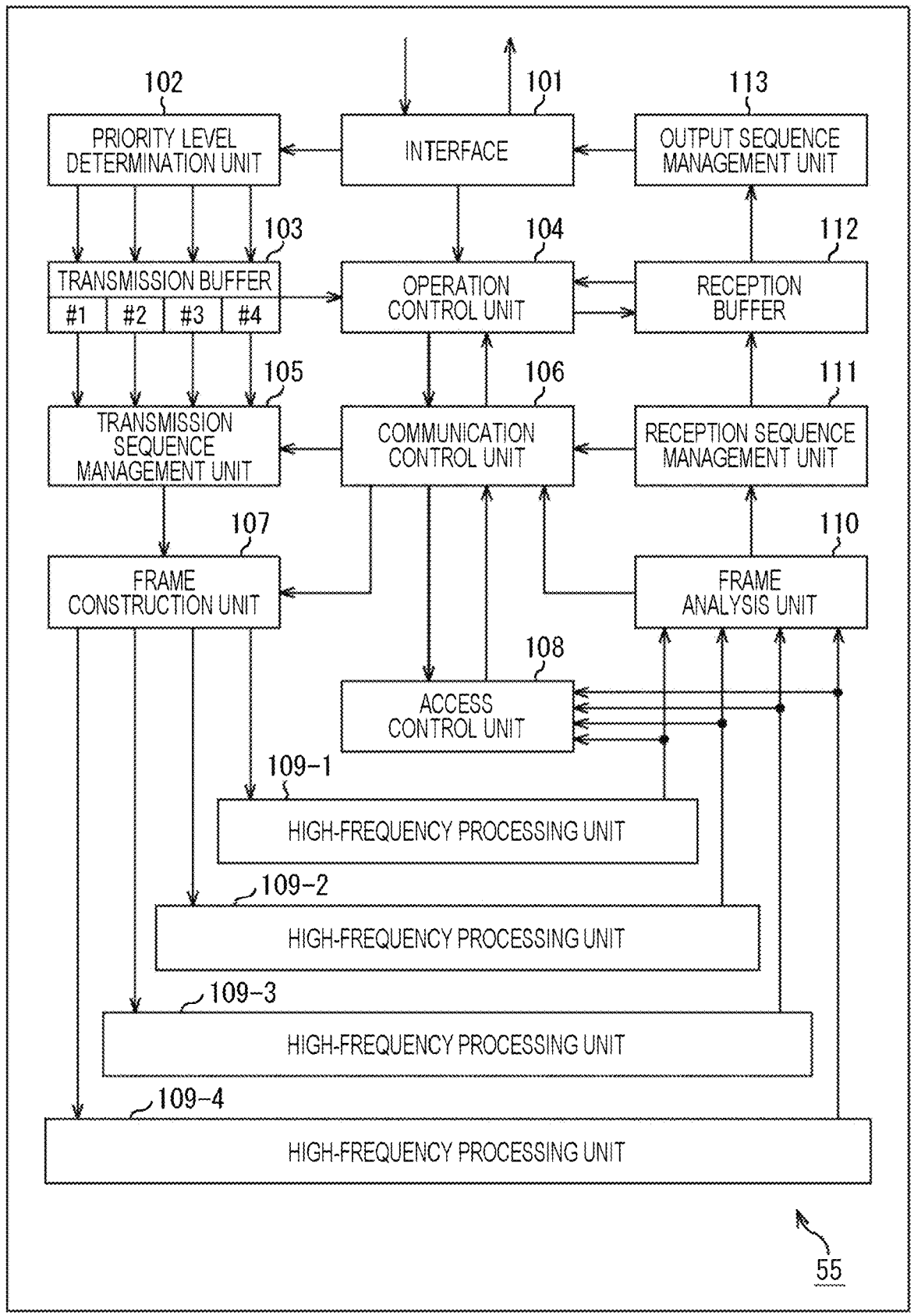
FIG. 8 is a block diagram showing an example configuration of a wireless communication module.

FIG. 8 is a block diagram showing an example configuration of the wireless communication module 55.

The wireless communication module 55 includes an interface 101, a priority level determination unit 102, a transmission buffer 103, an operation control unit 104, a transmission sequence management unit 105, a communication control unit 106, a frame construction unit 107, and an access control unit 108. The wireless communication module 55 also includes high-frequency processing units 109-1 to 109-4, a frame analysis unit 110, a reception sequence management unit 111, a reception buffer 112, and an output sequence management unit 113.

The interface 101 functions as an interface for exchanging information that is input from the user through the device control module 53, data that is supplied from the Internet network, or information to be provided to the user, in a predetermined signal format.

The interface 101 outputs data supplied from the device control module 53 to the priority level determination unit 102 and the operation control unit 104. The interface 101 outputs data supplied from the output sequence management unit 113 to the device control module 53.

The priority level determination unit 102 recognizes the setting of the priority level of the data to be transmitted. The priority level determination unit 102 determines the priority level in accordance with the access category (AC), and stores the data into the transmission buffer 103 in accordance with the priority level.

In a case where information input from a user or a signal for performing wireless transmission is received, the transmission buffer 103 temporarily stores the received signal. The transmission buffer 103 includes transmission buffers #1 to #4 that store data in accordance with priority levels.

The operation control unit 104 is a component that manages the operating state of the wireless communication module 55 in an integrated manner. On the basis of information supplied from the interface 101, the transmission buffer 103, the communication control unit 106, and the reception buffer 112, the operation control unit 104 sequentially performs necessary settings with respect to transmission and reception of data for the communication control unit 106 and the reception buffer 112.

In response to an instruction from the communication control unit 106, the transmission sequence management unit 105 sets a series of transmission sequence numbers for data to be transmitted, in accordance with the priority level of the data. The transmission sequence management unit 105 also acquires data from the transmission buffer 103 in descending order of priority levels, and outputs the data to the frame construction unit 107.

The communication control unit 106 manages operations for transmitting and receiving data through a plurality of frequency bands, on the basis of information supplied from the access control unit 108, the frame analysis unit 110, and the reception sequence management unit 111. The communication control unit 106 recognizes the frame construction and the data transmission/reception state in each frequency band, and controls the transmission sequence management unit 105 and the frame construction unit 107 on the basis of a priority sequence of the present technology.

The frame construction unit 107 constructs a data (MPDU) frame or an MPDU (A-MPDU) frame aggregated from a plurality of pieces of data (MPDUs), in response to an instruction from the communication control unit 106. The frame construction unit 107 constructs a PBAR frame, a BAR frame, a BA frame, a PBA frame, and the like, in accordance with an instruction from the communication control unit 106.

The frame construction unit 107 outputs constructed frames to the high-frequency processing units 109-1 to 109-4 corresponding to the frequency bands being used for transmission.

The access control unit 108 manages access control in a plurality of frequency bands in an integrated manner, on the basis of information indicating signal detection states supplied from the respective high-frequency processing units 109-1 to 109-4. The access control unit 108 outputs information indicating that one of the frequency bands has become available, to the communication control unit 106.

The high-frequency processing units 109-1 to 109-4 perform predetermined high-frequency processing on frames supplied from the frame construction unit 107, and construct a signal in each frequency band among a plurality of frequency bands. The high-frequency processing units 109-1 to 109-4 transmit the constructed signals to the communication device 11 at the other end.

The high-frequency processing units 109-1 to 109-4 receive the signals transmitted from the communication device 11 at the other end through the respective frequency bands, and recognize the signal detection states in the respective frequency bands. The high-frequency processing units 109-1 to 109-4 output information indicating the signal detection states in the respective frequency bands to the access control unit 108. The high-frequency processing units 109-1 to 109-4 each perform predetermined processing on the received signal to extract a frame, and output the frame to the frame analysis unit 110.

Note that the high-frequency processing units 109-1 to 109-4 will be hereinafter referred to as the high-frequency processing units 109 in a case where there is no particular need to distinguish them from one another. A predetermined antenna is attached to each of the high-frequency processing units 109, so that radio signals are transmitted and received at predetermined frequencies.

The frame analysis unit 110 extracts a header portion and individual data (MPDUs) from an A-MPDU frame received through each frequency band. The frame analysis unit 110 analyzes the frame from the information written in the extracted header portion. The frame analysis unit 110 outputs the information written in the extracted header portion to the communication control unit 106. The frame analysis unit 110 decodes the extracted MPDUs, and outputs the MPDUs to the reception sequence management unit 111.

The reception sequence management unit 111 extracts and manages parameters such as sequence numbers from the MPDUs supplied from the frame analysis unit 110. The reception sequence management unit 111 determines the MPDUs that have been correctly received, and generates a PBA or a BA that is an acknowledgment of receipt of the MPDUs that have been correctly received. The reception sequence management unit 111 outputs the extracted parameters and the generated PBA or BA to the communication control unit 106.

The reception sequence management unit 111 checks the start flags (PSFs), the intermediate flags (PCFs), and the end flags (PEFs) of the MPDUs described above with reference to FIG. 4, collects data in accordance with the respective priority levels, and stores the MPDUs into the reception buffer 112.

The reception buffer 112 stores the collected data (MPDUs) in accordance with the priority levels. Note that the priority levels are determined in accordance with the transmission sequence numbers, and accordingly, the output sequence management unit 113 recognizes the priority levels in accordance with the order of sequence numbers.

In a case where data of each predetermined priority level is stored into the reception buffer 112, the output sequence management unit 113 performs control to output the data to the information output module 54 or a device connected to the communication device 11, via the interface 101.

Note that the communication device 11 may include only the necessary modules among the modules shown in FIG. 7, or may have a configuration in which unnecessary modules are simplified or are not incorporated.

3. Operation of the Wireless Communication System

<Communication Sequence in the Wireless Communication System>

Figure 9:
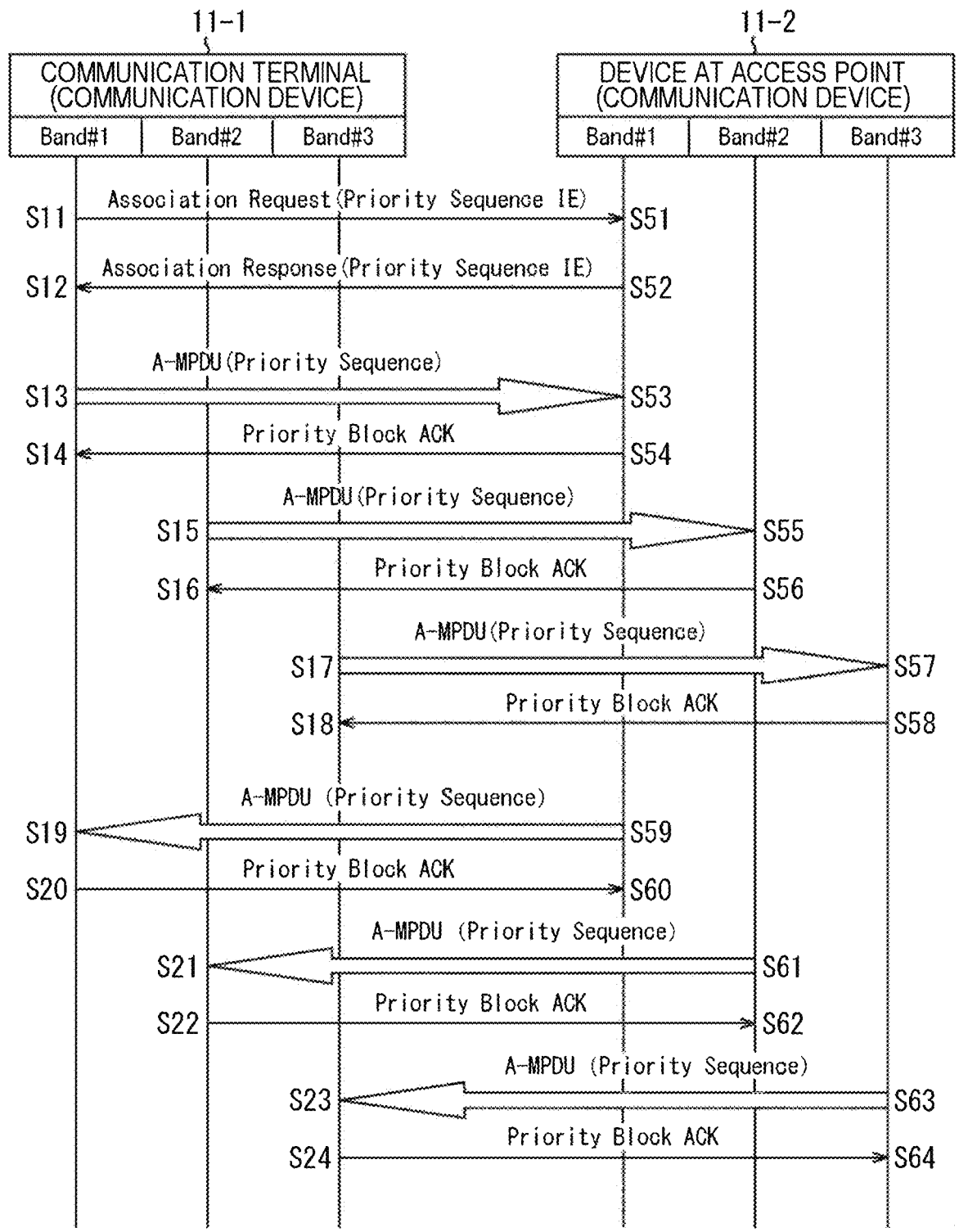
FIG. 9 is a chart showing a communication sequence in the wireless communication system.

FIG. 9 is a chart showing a communication sequence in the wireless communication system shown in FIG. 1.

In FIG. 9, the communication device 11-1 is a communication device on the transmission side, and is a communication terminal. The communication device 11-2 is a communication device on the reception side, and serves as a device at an access point. The communication devices 11-1 and 11-2 perform communication based on a priority sequence of the present technology, using frequency bands #1 to #3 that are shown as Bands #1 to #3, respectively.

In step S11, the communication device 11-1 transmits an association request frame to the communication device 11-2, to conduct association. Association is a procedure for a communication terminal to enter a wireless network. An association request frame is a frame for a communication terminal to enter a wireless network. The association request frame is transmitted through the frequency band #1, for example.

At that point of time, the communication device 11-1 transmits a priority sequence information element (Priority Sequence IE) included in the association request frame. The priority sequence information element is information for exchanging the setting of the priority sequence described above with reference to FIG. 5 or FIG. 6, information about the plurality of frequency bands to be used, and the like, between the device at an access point and the communication terminal at the time of association as described above.

In step S51, the communication device 11-2 receives the association request frame transmitted from the communication device 11-1 using the frequency band #1.

In step S52, the communication device 11-2 returns an association response (Association Response) frame to the communication device 11-1. An association response frame is a frame for a device at an access point to allow a communication terminal to enter a wireless network.

At that point of time, the communication device 11-2 transmits a priority sequence information element (Priority Sequence IE) that is agreed by both sides and is included in the association response frame.

In step S12, the communication device 11-1 receives the association response frame transmitted from the communication device 11-2 using the frequency band #1.

As a result, in a case where the frequency bands #1 to #3 are available, the channels to be used in the respective frequency bands are specified, and the respective operations are set.

After that, the communication terminal and the device at an access point serve as the transmission side and the reception side, respectively, perform communication based on the priority sequence of the present technology, and return a priority block ACK (PBA) frame for acknowledging the receipt.

For example, in a case where the frequency bands #1 to #3 become available in this order, the communication device 11-1 in step S13 transmits an A-MPDU (Priority Sequence) frame according to the priority sequence of the present technology, to the communication device 11-2 through the frequency band #1.

In step S53, the communication device 11-2 receives the A-MPDU (Priority Sequence) frame transmitted from the communication device 11-1 through the frequency band #1. In step S54, the communication device 11-2 transmits a PBA frame for acknowledging receipt of the A-MPDU (Priority Sequence) to the communication device 11-1 through the frequency band #1.

In step S14, the communication device 11-1 receives the PBA frame transmitted from the communication device 11-2 through the frequency band #1. In step S15, the communication device 11-1 transmits an A-MPDU (Priority Sequence) frame to the communication device 11-2 through the frequency band #2.

In step S55, the communication device 11-2 receives the A-MPDU (Priority Sequence) frame transmitted from the communication device 11-1 through the frequency band #2. In step S56, the communication device 11-2 transmits a PBA frame for acknowledging receipt of the A-MPDU (Priority Sequence) to the communication device 11-1 through the frequency band #2.

In step S16, the communication device 11-1 receives the PBA frame transmitted from the communication device 11-2 through the frequency band #2. In step S17, the communication device 11-1 transmits an A-MPDU (Priority Sequence) frame to the communication device 11-2 through the frequency band #3.

In step S57, the communication device 11-2 receives the A-MPDU (Priority Sequence) frame transmitted from the communication device 11-1 through the frequency band #3. In step S58, the communication device 11-2 transmits a PBA frame for acknowledging receipt of the A-MPDU (Priority Sequence) to the communication device 11-1 through the frequency band #3.

In step S18, the communication device 11-1 receives the PBA frame transmitted from the communication device 11-2 through the frequency band #3.

On the other hand, the communication device 11-2, which is an access point, transmits an A-MPDU (Priority Sequence) frame to the communication device 11-1 through the frequency band #1 in step S59.

In step S19, the communication device 11-1 receives the A-MPDU (Priority Sequence) frame transmitted from the communication device 11-2 through the frequency band #1. In step S20, the communication device 11-1 transmits a PBA frame for acknowledging receipt of the A-MPDU (Priority Sequence) to the communication device 11-2 through the frequency band #1.

In step S60, the communication device 11-2 receives the PBA frame transmitted from the communication device 11-1 through the frequency band #1. In step S61, the communication device 11-2 transmits an A-MPDU (Priority Sequence) frame to the communication device 11-1 through the frequency band #2.

In step S21, the communication device 11-1 receives the A-MPDU (Priority Sequence) frame transmitted from the communication device 11-2 through the frequency band #2. In step S22, the communication device 11-1 transmits a PBA frame for acknowledging receipt of the A-MPDU (Priority Sequence) to the communication device 11-2 through the frequency band #2.

In step S62, the communication device 11-2 receives the PBA frame transmitted from the communication device 11-1 through the frequency band #2. In step S63, the communication device 11-2 transmits an A-MPDU (Priority Sequence) frame to the communication device 11-1 through the frequency band #3.

In step S23, the communication device 11-1 receives the A-MPDU (Priority Sequence) frame transmitted from the communication device 11-2 through the frequency band #3. In step S24, the communication device 11-1 transmits a PBA frame for acknowledging receipt of the A-MPDU (Priority Sequence) to the communication device 11-2 through the frequency band #3.

In step S64, the communication device 11-2 receives the PBA frame transmitted from the communication device 11-1 through the frequency band #3.

The communication sequence as described above is performed between the communication terminal and the device at an access point.

4. Frame Configurations

<Example Configuration of a Frame>

Figure 10:
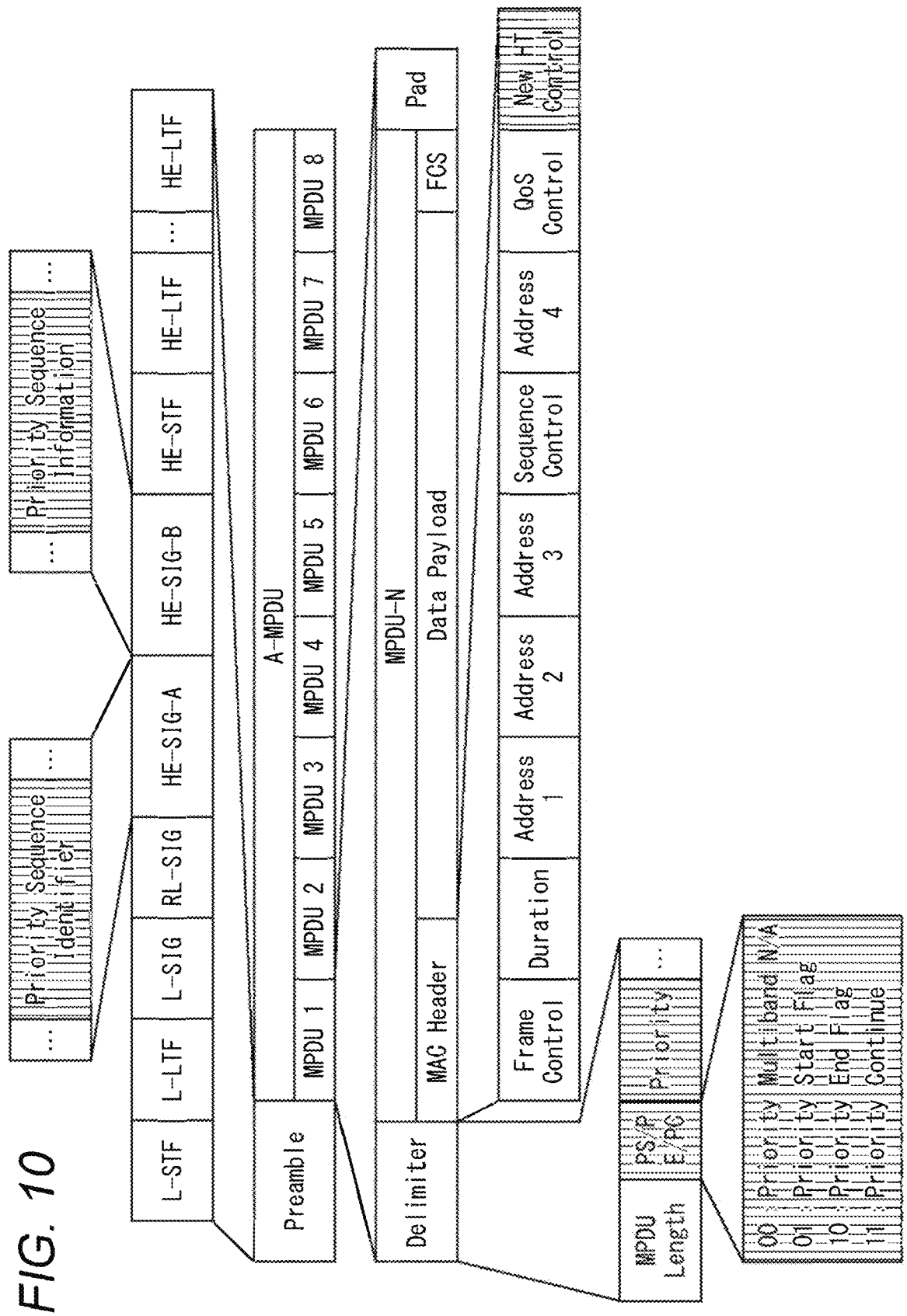
FIG. 10 is a diagram showing an example frame configuration according to the present technology.

FIG. 10 is a diagram showing an example frame configuration according to the present technology.

The frame shown in FIG. 10 includes a preamble (Preamble) and a data frame including an A-MPDU frame. Note that information indicated by shaded portions in the frame in FIG. 10 is information according to the present technology.

The preamble includes L-STF, L-LTF, L-SIG, RL-SIG, HE-SIG-A, HE-SIG-B, HE-STF, and a HE-LTF group.

HE-SIG-A includes, as a parameter, a Priority Sequence Identifier bit for identifying a priority sequence according to the present technology to be executed.

By checking this Priority Sequence Identifier bit, the communication device 11 on the reception side can recognize that data (MPDUs) having different priority levels is transmitted through a plurality of frequency bands, and that the A-MPDU includes MPDUs having different priority levels.

HE-SIG-B includes, as a parameter, Priority Sequence Info required for managing a series of sequence numbers in a plurality of frequency bands in accordance with priority levels. In Priority Sequence Info, various parameters such as information indicating a plurality of frequency bands are written.

In the case shown in FIG. 10, the A-MPDU formed as an A-MPDU frame is formed by aggregating eight MPDUs that are MPDU 1 to MPDU 8. An EOF padding is added to the A-MPDU as necessary.

Each MPDU formed as an A-MPDU subframe has a predetermined delimiter (Delimiter) and a tail Padding added thereto as necessary. An MPDU includes a predetermined MAC header, a data payload (Data Payload), and a frame check sequence (FCS). Note that, in a case where the A-MPDU frame is shorter than a predetermined length, a padding Pad portion is added to the end of each MPDU as necessary.

The delimiter includes MPDU Length, flag information including Priority Start Flag, Priority END Flag, and Priority Continue Flag, and Priority.

MPDU Length is information indicating the length of an MPDU. Priority Start Flag is a flag indicating that the data is the first data in the data group having the same priority level. Priority END Flag is a flag indicating that the data is the last data in the data group having the same priority level. Priority Continue Flag is a flag indicating that the data is intermediate data in the data group having the same priority level. The priority level is written in Priority as necessary. With these flags, the communication device 11 on the reception side can recognize to which data the same priority level continues, and the delimiter for each priority level. Alternatively, in an exemplary mode in which these states are expressed with two bits, a case where data is formed with one MPDU, or incompatibility with a configuration of the present technology may be expressed with four identifiable values.

The MAC header (Header) includes Frame Control, Duration, Address 1 to Address 4, Sequence Control, Qos Control, and New HT Control.

Frame Control is information indicating the frame format. Duration is information indicating the duration. Address 1 to Address 4 are information for appropriately designating communication devices. Sequence Control is information indicating the sequence number or the like. Qos Control is information indicating a Qos parameter. New HT Control is information indicating a high-speed transmission parameter.

Note that FIG. 10 shows an example in which Priority Start Flag, Priority END Flag, Priority Continue Flag, and Priority, which are information regarding the priority sequence according to the present technology, are written in the delimiter. The site in which the information regarding the priority sequence according to the present technology is written is not necessarily the delimiter. For example, the information regarding the priority sequence according to the present technology may be written in New HT Control or the like as appropriate.

<Example Configuration of a Block ACK Request Frame>

Figure 11:
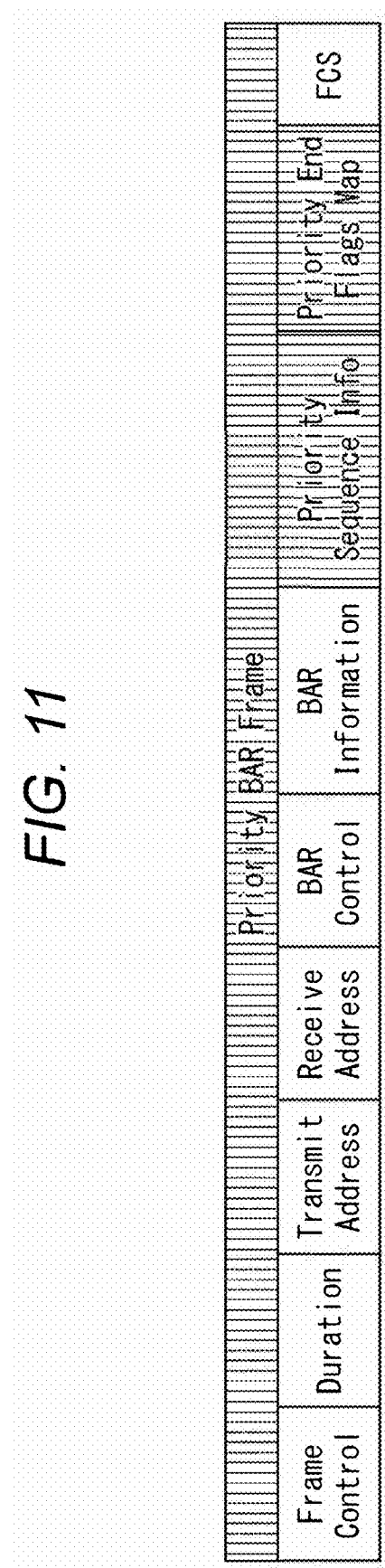
FIG. 11 is a diagram showing an example configuration of a priority block ACK request frame.

FIG. 11 is a diagram showing an example configuration of a priority block ACK request frame (Priority BAR Frame) according to the present technology.

The priority block ACK request frame shown in FIG. 11 includes Frame Control, Duration, Transmit Address (TA), Receive Address (RA), BAR Control, BAR Information, Priority Sequence Info, Priority End Flags MAP, and FCS. Note that, in the priority block ACK request frame in FIG. 11, Priority Sequence Info and Priority End Flags MAP, which are information indicated by shaded portions, are information regarding a priority sequence according to the present technology.

Frame Control is information indicating the frame format. Duration is information indicating the duration. Transmit Address is information designating the communication device 11 on the transmission side. Receive Address is information designating the communication device 11 on the reception side. BAR Control is information indicating control information for requesting a block ACK. The BAR information is information including information about a start sequence number for requesting a block ACK, and bitmap information indicating the range to be requested.

Priority Sequence Info (priority sequence information) is information including various parameters required for managing a series of sequence numbers of a plurality of frequency bands in accordance with priority levels. For example, Priority Sequence Info includes information indicating the plurality of frequency bands to be used. Priority End Flags MAP is information indicating a list of the last (delimiter) data in the data group having the same priority level. FCS is a frame check sequence for error detection.

<Example Configuration of a Block ACK Frame>

Figure 12:
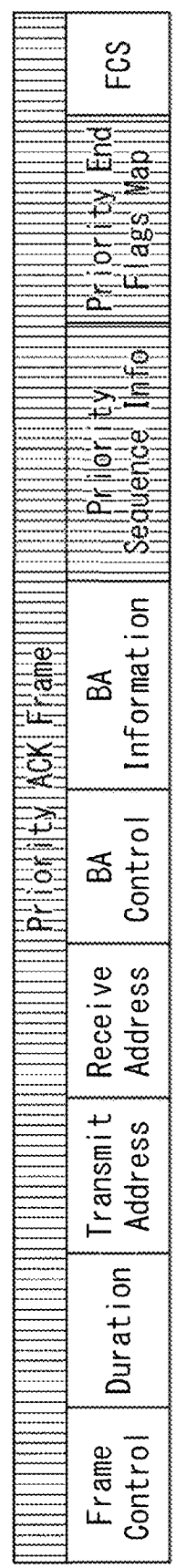
FIG. 12 is a diagram showing an example configuration of a priority block ACK frame.

FIG. 12 is a diagram showing an example configuration of a priority block ACK frame (Priority ACK Frame) according to the present technology.

In the priority block ACK frame shown in FIG. 12, BA Control and BA Information are provided simply in place of BAR Control and BAR Information, and the other information is similar to that shown in FIG. 11. The explanations that have already been made will not be repeated below.

The priority block ACK frame includes Frame Control, Duration, Transmit Address (TA), Receive Address (RA), BA Control, BA Information, Priority Sequence Info, Priority End Flags MAP, and FCS.

BA Control is information indicating control information for transmitting a block ACK. BA Information is information including information about a start sequence number for transmitting a block ACK and bitmap information indicating the range to be requested.

<Example Configuration of a Priority Sequence Information Element>

FIG. 13 is a diagram showing an example configuration of a priority sequence information element according to the present technology.

The priority sequence information element shown in FIG. 13 includes Element ID, Length, Priority Type, Operation Band, Transmit Back-off Time, Sequence No. Management, A-MPDU Max Length, and FCS.

Element ID is information for identifying the information element as a priority sequence information element. Length is information indicating the length of information. Priority Type is information for designating the format of priority levels according to the present technology. Operation Band is information for designating the frequency band to be used.

Transmit Back-off Time is the transmission standby time that is set in accordance with the priority level. Sequence No. Management is information defining a sequence number management method. A-MPDU Max Length is information indicating the maximum length of an A-MPDU to be aggregated. FCS is a frame check sequence for error detection.

5. Operations of Communication Devices

<Operation of the Communication Device on the Transmission Side>

Figure 14:
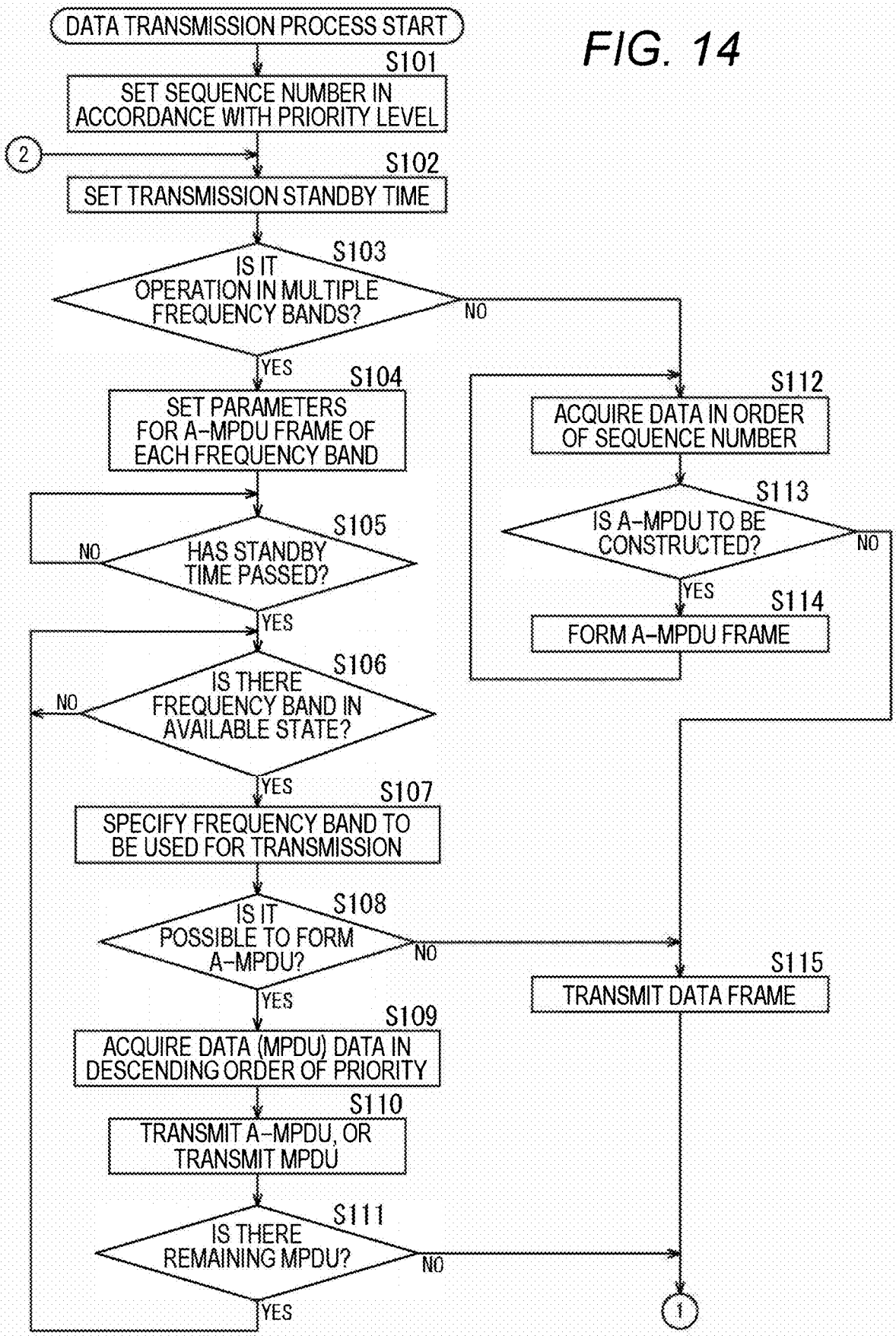
FIG. 14 is a flowchart for explaining a data transmission process to be performed by a communication device on the transmission side.
Figure 15:
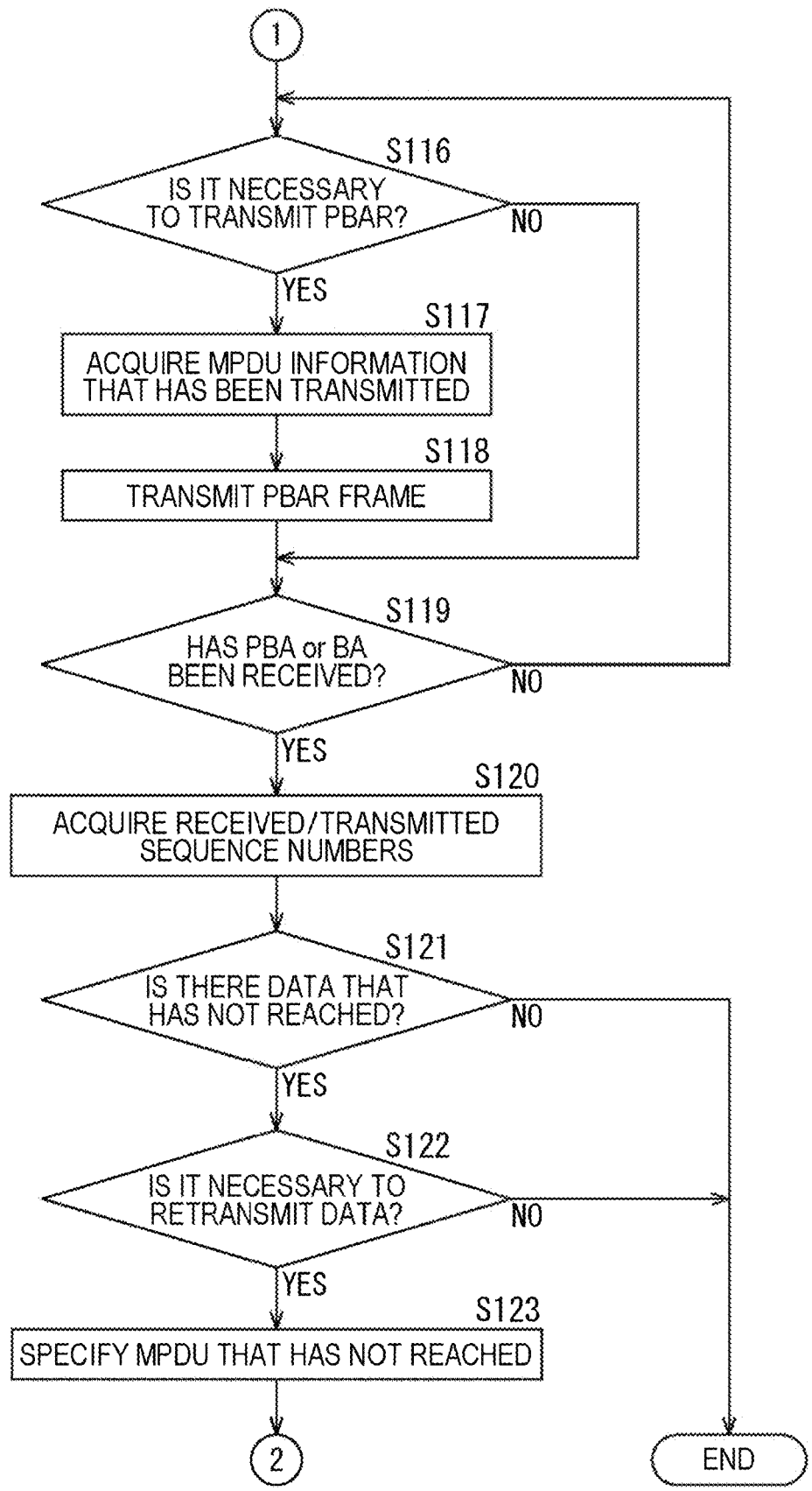
FIG. 15 is a flowchart for explaining the data transmission process to be performed by the communication device on the transmission side, continuing from FIG. 14.

FIGS. 14 and 15 are flowcharts for explaining a data transmission process to be performed by the communication device 11-1 on the transmission side.

In FIG. 14, in a case where the data to be transmitted has been received beforehand from an application of a higher layer via the interface 101, the data to be transmitted is stored in the transmission buffer 103 in accordance with the priority levels. In a case where a predetermined amount of information is stored in the transmission buffer 103, an operation of transmitting a series of data is then started.

In step S101, the transmission sequence management unit 105 sets a series of sequence numbers in accordance with the priority levels of the data. The data for which the sequence numbers are set by the transmission sequence management unit 105 is supplied to the frame construction unit 107.

In step S102, the communication control unit 106 sets a transmission standby time.

In step S103, the communication control unit 106 determines whether or not the operation is in a plurality of frequency bands. If the operation is determined to be in a plurality of frequency bands in step S103, the process moves on to step S104.

In step S104, the communication control unit 106 sets parameters (such as a maximum length and a transmission rate (MCS)) of the A-MPDU frame of each frequency band.

In step S105, the communication control unit 106 stands by until the standby time set in step S102 elapses. If it is determined in step S105 that the set standby time has elapsed, the process moves on to step S106.

In step S106, the communication control unit 106 stands by until determining that there is a frequency band in an available state, on the basis of information that is supplied from the access control unit 108 and indicates the states of a plurality of frequency bands. If it is determined in step S106 that there is a frequency band in an available state, the process moves on to step S107.

In step S107, the communication control unit 106 specifies the frequency band to be used for transmission, on the basis of the information that is supplied from the access control unit 108 and indicates the states of the plurality of frequency bands.

In step S108, the communication control unit 106 determines whether or not an A-MPDU can be formed. If it is determined in step S108 that an A-MPDU can be formed, the process moves on to step S109.

In step S109, the transmission sequence management unit 105 acquires data (MPDUs) from the transmission buffer 103 in descending order of priority levels, and outputs the data to the frame construction unit 107.

In step S110, the frame construction unit 107 constructs (the MPDUs constituting) an A-MPDU frame or a (single) MPDU frame, using the data (MPDUs) supplied from the transmission sequence management unit 105. The frame construction unit 107 outputs the constructed A-MPDU frame or MPDU frame to the high-frequency processing unit 109 corresponding to the frequency band to be used for transmission. As a result, an A-MPDU frame or a MPDU frame is transmitted from the high-frequency processing unit 109 corresponding to the frequency band to be used for transmission, to the communication device 11-2 at the other end.

Here, in the case of the example shown in FIG. 5, an A-MPDU including MPDUs having the same priority level is formed. Therefore, in step S110, an operation of transmitting an A-MPDU frame is set as a transmission operation in the corresponding frequency band. In the case of the example shown in FIG. 6, an operation of transmitting MPDUs having higher priority levels is set as a sequential transmission operation in the corresponding frequency band.

In step S111, the communication control unit 106 determines whether or not there is a remaining one of the MPDUs constituting the A-MPDU not smaller than a predetermined size. If it is determined in step S111 that there is a remaining MPDU, the process returns to step S106.

If the operation is determined not to be an operation in a plurality of frequency bands in step S103, on the other hand, the process moves on to step S112.

In step S112, the transmission sequence management unit 105 acquires data (MPDUs) in the order of sequence numbers, and outputs the data to the frame construction unit 107.

In step S113, the frame construction unit 107 determines whether or not to construct an A-MPDU. In a case where the length of the A-MPDU is smaller than a predetermined length, it is determined to continue to construct the A-MPDU, and the process moves on to step S114.

In step S114, the frame construction unit 107 constructs an A-MPDU frame. After an A-MPDU frame is constructed, the process returns to step S112, and the process after that is repeated.

In a case where the length of the A-MPDU becomes equal to the predetermined length or where a single MPDU is to be transmitted, it is determined that any A-MPDU is not to be constructed, and the process moves on to step S115.

If it is determined in step S108 that any A-MPDU cannot be formed, the process also moves on to step S115.

In step S115, the frame construction unit 107 outputs a frame to the high-frequency processing unit 109 corresponding to a predetermined frequency band. As a result, an A-MPDU frame or a MPDU frame is transmitted as a data frame from the high-frequency processing unit 109 corresponding to the predetermined frequency band.

After the transmission in step S115, the process moves on to step S116 in FIG. 15. Meanwhile, if it is determined in step S111 that there are no remaining MPDUs, a padding Pad is inserted into the A-MPDU frame as necessary, and the process moves on to step S116.

In step S116, the communication control unit 106 determines whether or not transmission of a priority block ACK request (PBAR) is necessary. If it is determined that transmission of a priority block ACK request (PBAR) is necessary, the process moves on to step S117.

In step S117, in response to an instruction from the communication control unit 106, the transmission sequence management unit 105 acquires the MPDU information already transmitted at that point of time from the transmission buffer 103, and outputs the acquired transmitted MPDU information to the frame construction unit 107.

In step S118, the frame construction unit 107 constructs a priority block ACK request (PBAR) frame in which the transmitted MPDU information is written, and outputs the constructed frame to the high-frequency processing unit 109 corresponding to the frequency band in which transmission has been completed the earliest. As a result, the priority block request (PBAR) frame in which the transmitted MPDU information is written is transmitted through the frequency band in which transmission has been completed the earliest. After the transmission of the PBAR frame, the process moves on to step S119.

Note that, as information about the series of sequence numbers scheduled to be transmitted is acquired, a priority block ACK request (PBAR) frame in which information about the series of sequence numbers scheduled to be transmitted is written may be transmitted.

If it is determined that transmission of a priority block ACK request (PBAR) is unnecessary, on the other hand, steps S117 and S118 are skipped, and the process moves on to step S119.

In step S119, the frame analysis unit 110 determines whether or not a PBA or a BA has been received. If it is determined in step S119 that neither a PBA nor a BA has been received, the process returns to step S116, and the processes after that are repeated.

In a case where an ACK frame directed to the device is supplied from the high-frequency processing unit 109, it is determined in step S119 that a PBA or a BA has been received, and the process moves on to step S120.

In step S120, the reception sequence management unit 111 acquires the received sequence numbers from the ACK frame that is directed to the device and has been analyzed by the frame analysis unit 110, and outputs the sequence numbers to the communication control unit 106. From the transmission sequence management unit 105, the communication control unit 106 also acquires the sequence numbers transmitted from the device.

In step S121, the communication control unit 106 refers to the received sequence numbers and the transmitted sequence numbers, to determine whether or not there is data that has not reached yet. If it is determined in step S121 that there is data that has not reached, the process moves on to step S122.

In step S122, the communication control unit 106 determines whether or not data retransmission is necessary. If it is determined in step S122 that data retransmission is necessary, the process moves on to step S123.

In step S123, the communication control unit 106 specifies data (a MPDU) that has not reached. After data that has not reached is specified, the process returns to step S102 in FIG. 14, and the processes after that are repeated.

If it is determined in step S121 that there is no data that has not reached, or if it is determined in step S122 that data retransmission is not necessary, on the other hand, the data transmission process by the communication device 11-1 comes to an end.

<Operation of the Communication Device on the Reception Side>

Figure 16:
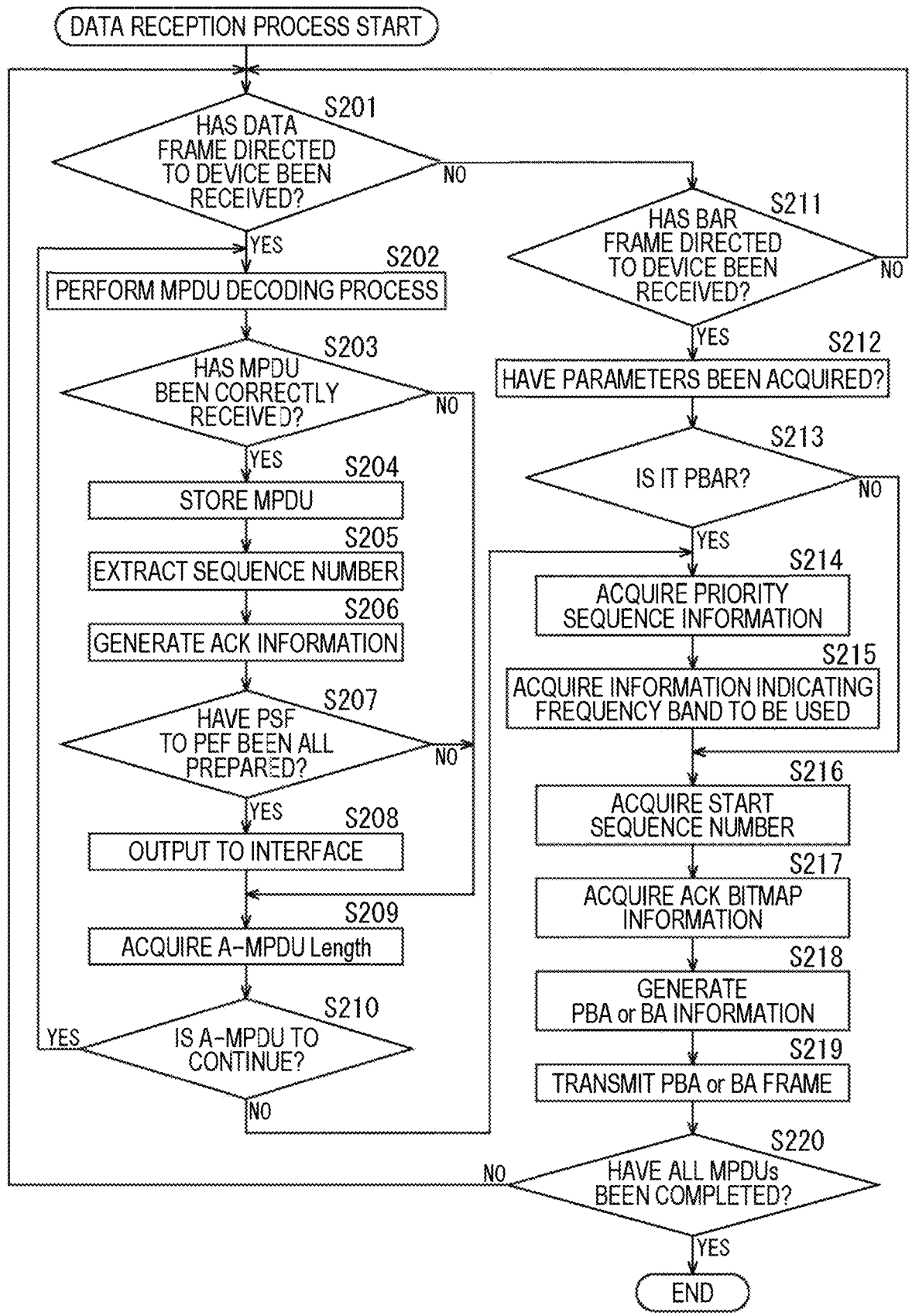
FIG. 16 is a flowchart showing a data reception process to be performed by a communication device on the reception side.

FIG. 16 is a flowchart showing a data reception process to be performed by the communication device 11-2 on the reception side.

In the case shown in FIG. 16, data frames transmitted from the communication device 11-1 on the transmission side through one frequency band are sequentially received with a configuration according to a predetermined preamble pattern in the corresponding high-frequency processing unit 109.

The high-frequency processing unit 109 outputs the received data frames to the frame analysis unit 110.

In step S201, the frame analysis unit 110 analyzes the data frames supplied from the high-frequency processing unit 109, and determines whether or not a data frame directed to the device has been received. If it is determined in step S201 that a data frame directed to the device has been received, the process moves on to step S202.

In step S202, the frame analysis unit 110 extracts the header portion, the delimiter portion, and individual data (MPDU) from a MPDU frame, and performs a decoding process on the MPDU. The frame analysis unit 110 outputs the information written in the extracted header portion to the communication control unit 106. The frame analysis unit 110 outputs the decoded MPDU to the reception sequence management unit 111.

In step S203, the reception sequence management unit 111 determines whether or not the MPDU has been correctly received. If it is determined in step S203 that the MPDU has been correctly received, the process moves on to step S204.

In step S204, the reception sequence management unit 111 checks the start flag (PSF), the intermediate flags (PCFs), and the end flag (PEF) of the MPDU, collects data in accordance with the priority level of the MPDU, and stores the MPDU into the reception buffer 112.

In step S205, the reception sequence management unit 111 extracts a sequence number from the MPDU.

In step S206, the reception sequence management unit 111 generates ACK information about the extracted sequence number.

In step S207, the output sequence management unit 113 determines whether or not the PSF to the PEF have been collected, from the flag information in the delimiter. If it is determined in step S207 that the PSF to PEF have been collected, the process moves on to step S208.

In step S208, the output sequence management unit 123 outputs a series of data including the PSF to the PEF, to the interface 101.

If it is determined in step S203 that the MPDU has not been correctly received, on the other hand, the process skips steps S204 to S208, and moves on to step S209. That is, ACK information is not generated.

If it is determined in step S207 that the PSF to the PEF have not been collected, on the other hand, the process skips step S208, and moves on to step S209.

In step S209, the frame analysis unit 110 acquires A-MPDU Length information.

In step S210, the frame analysis unit 110 determines whether or not the A-MPDU continues, on the basis of the A-MPDU Length information. If it is determined that the A-MPDU continues, the process returns to step S202, and the processes after that are repeated.

If it is determined in step S201 that any data frame directed to the device has not been received, on the other hand, the process moves on to step S211.

In step S211, the frame analysis unit 110 determines whether or not a BAR frame directed to the device has been received. If it is determined in step S211 that any BAR frame directed to the device has not been received, the process returns to step S201, and the processes after that are repeated.

If it is determined in step S211 that a BAR frame directed to the device has been received, the process moves on to step S212.

In step S212, the frame analysis unit 110 acquires parameters from the BAR frame directed to the device.

In step S213, the frame analysis unit 110 determines whether or not the BAR frame directed to the device is a PBAR according to the present technology. If it is determined in step S213 that the BAR frame directed to the device is a PBAR according to the present technology, the process moves on to step S214.

If it is determined in step S210 that the A-MPDU does not continue, on the other hand, the process moves on to step S214.

In step S214, the frame analysis unit 110 acquires priority sequence information (FIG. 11) from the BAR frame directed to the device.

In step S215, the frame analysis unit 110 acquires information indicating the frequency band to be used, from the priority sequence information.

After the processing in step S215, or if the BAR frame is determined not to be a PBAR according to the present technology in step S213, the process moves on to step S216.

In step S216, the frame analysis unit 110 acquires the start sequence number from the BAR frame directed to the device.

In step S217, the communication control unit 106 acquires ACK bitmap information of the MPDU that has been correctly received, from the BAR frame directed to the device.

In step S218, the communication control unit 106 generates PBA or BA information, on the basis of the acquired ACK bitmap information. The PBA or BA information is supplied from the communication control unit 106 to the frame construction unit 107.

In step S219, the frame construction unit 107 transmits a PBA frame based on the PBA information supplied from the communication control unit 106, or a BA frame generated on the basis of the BA information.

In step S220, the communication control unit 106 determines whether or not all the MPDUs have been completed. If it is determined in step S220 that not all the MPDUs have been completed yet, the process returns to step S201, and the processes thereafter are repeated.

If it is determined in step S220 that all the MPDUs have been completed, the data reception process in the communication device 11-2 comes to an end.

6. Other Aspects

<Effects>

As described above, in the present technology, a series of sequence numbers are set to data to be transmitted to one transmission destination through a plurality of frequency bands. Thus, it is possible to acknowledge receipt of data transmitted through another frequency band.

Further, by acknowledging receipt of data transmitted through another frequency band at the same time, it is possible to acknowledge receipt of a MPDU even when an A-MPDU is being transmitted through the another frequency band.

According to the present technology, a series of sequence numbers are set in accordance with priority levels. Thus, it is possible to determine which priority level is higher, from the sequence numbers.

After data (an A-MPDU) is transmitted through a plurality of frequency bands, receipt acknowledgment information regarding all the received data is returned through the frequency band in which the transmission has been completed the earliest. Thus, it is possible to send a notification of the reception states of all the data that has been successfully received through the plurality of frequency bands at that point of time. As a result, receipt acknowledgment information can be efficiently collected, without transmission of receipt acknowledgment information through each frequency band.

By forming an A-MPDU frame in accordance with the priority levels, it is possible to start transmitting the data having the highest priority level first, in a case where an access right has been acquired through a specific frequency band.

As the data having the highest priority level is transmitted through a plurality of frequency bands each time an access right is acquired. Thus, the communication device on the reception side can collect the data having the higher priority levels at an earlier stage.

As the data to be transmitted includes positional information (flags) at the same priority level, the reception side can also identify which data has the same priority level.

Further, a series of received data can be output at an earlier stage, in accordance with the positional information at the same priority level.

A priority block ACK request (PBAR) frame requires return of ACKs regarding all the sequence numbers for which transmission through a plurality of frequency bands is scheduled. Thus, it is possible to notify the reception side of the sequence numbers of all the data to be transmitted through the plurality of frequency bands.

The data that has not arrived through a plurality of frequency bands can be recognized at an early stage. Thus, retransmission can be preferentially performed, starting from the data with the highest priority level.

Further, an A-MPDU frame is formed with the data having the highest priority level each time in a frequency band that has become available, in accordance with the priority levels of data. Thus, the data having the higher priority levels can be transmitted at an early stage.

<Example Configuration of a Computer>

The series of processes described above can be performed by hardware, and can also be performed by software. In a case where the series of processes are performed by software, the program that forms the software may be installed in a computer incorporated into special-purpose hardware, or may be installed from a program recording medium into a general-purpose personal computer or the like.

Figure 17:
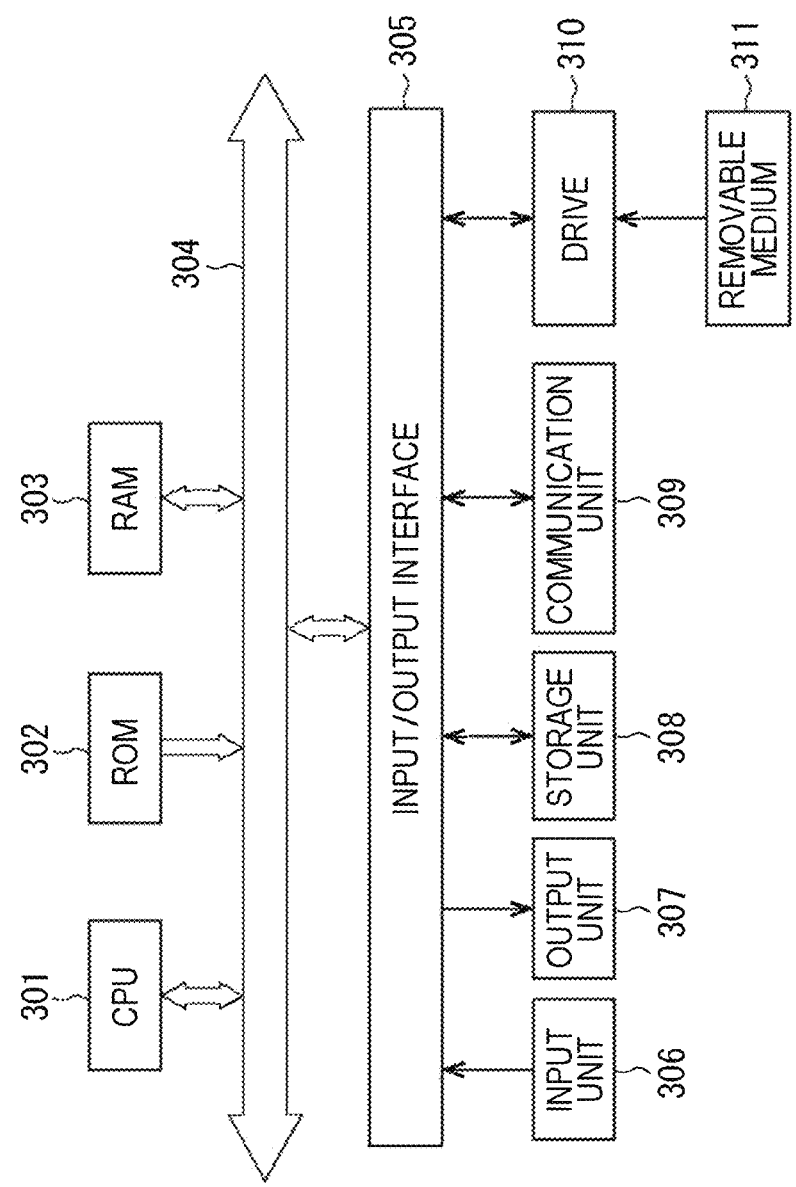
FIG. 17 is a block diagram showing an example configuration of a computer.

FIG. 17 is a block diagram showing an example configuration of the hardware of a computer that performs the above described series of processes in accordance with a program.

A central processing unit (CPU) 301, a read only memory (ROM) 302, and a random access memory (RAM) 303 are connected to one another by a bus 304.

An input/output interface 305 is further connected to the bus 304. An input unit 306 formed with a keyboard, a mouse, and the like, and an output unit 307 formed with a display, a speaker, and the like are connected to the input/output interface 305. Further, a storage unit 308 formed with a hard disk, a nonvolatile memory, or the like, a communication unit 309 formed with a network interface or the like, and a drive 310 that drives a removable medium 311 are connected to the input/output interface 305.

In the computer having the above described configuration, the CPU 301 loads a program stored in the storage unit 308 into the RAM 303 via the input/output interface 305 and the bus 304, for example, and executes the program, so that the above described series of processes are performed.

The program to be executed by the CPU 301 is recorded in the removable medium 311 and is thus provided, for example, or is provided via a wired or wireless transmission medium, such as a local area network, the Internet, or digital broadcasting. The program is then installed into the storage unit 308.

Note that the program to be executed by the computer may be a program for performing processes in chronological order in accordance with the sequence described in this specification, or may be a program for performing processes in parallel or performing a process when necessary, such as when there is a call.

It should be noted that, in this specification, a system means an assembly of a plurality of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Further, the advantageous effects described in this specification are merely examples, and the advantageous effects of the present technology are not limited to them or may include other effects.

Embodiments of the present technology are not limited to the embodiments described above, and various modifications may be made to them without departing from the scope of the present technology.

For example, the present technology may be embodied in a cloud computing configuration in which one function is shared among a plurality of devices via a network, and processing is performed by the devices cooperating with one another.

Further, the respective steps described with reference to the flowcharts described above may be carried out by one device or may be shared among a plurality of devices.

Furthermore, in a case where a plurality of processes is included in one step, the plurality of processes included in the one step may be performed by one device or may be shared among a plurality of devices.

<Example Combinations of Configurations>

The present technology may also be embodied in the configurations described below.

(1)

A wireless communication device including:

a sequence management unit that sets a series of sequence numbers to data to be transmitted to one transmission destination through a plurality of frequency bands;

a wireless transmission unit that transmits the data through the plurality of frequency bands; and a communication control unit that causes reception of receipt acknowledgment information through a frequency band in which transmission of the data has been completed first among the plurality of frequency bands, the receipt acknowledgment information indicating a receipt acknowledgment regarding the data transmitted through the plurality of frequency bands.

(2)

The wireless communication device according to (1), in which the communication control unit causes sequential transmission of the data through a frequency band that has entered an available state among the plurality of frequency bands, after a predetermined transmission standby time has passed.

(3)
The wireless communication device according to (1) or (2), in which,
in accordance with priority levels of the data, the sequence management unit sets the series of sequence numbers, starting from the data having the highest priority level.

(4)
The wireless communication device according to (3), in which
the sequence management unit adds information to the data, the information indicating a position of the data in a data group having the same priority level.

(5)
The wireless communication device according to (4), in which,
when the position of the data is the last position in the data group, the sequence management unit adds an end flag as the information indicating the position of the data.

(6)
The wireless communication device according to (4), in which,
when the position of the data is the first position in the data group, the sequence management unit adds a start flag as the information indicating the position of the data.

(7)
The wireless communication device according to (4), in which,
when the position of the data is an intermediate position in the data group, the sequence management unit adds an intermediate flag as the information indicating the position of the data.

(8)
The wireless communication device according to any one of (1) to (3), further including
a frame construction unit that constructs an A-MPDU frame including the data of a predetermined length.

(9)
The wireless communication device according to (8), in which,
when the A-MPDU frame is shorter than the predetermined length, the frame construction unit constructs the A-MPDU frame having a padding added to the end.

(10)
The wireless communication device according to (8), in which
the frame construction unit constructs an A-MPDU frame formed with a data group having the same priority level as the data to be transmitted through a frequency band that has entered an available state.

(11)
The wireless communication device according to (8), in which
the frame construction unit constructs an A-MPDU frame formed with the data that is high in the priority level and has not been transmitted, as the data to be transmitted through a frequency band that has entered an available state.

(12)
The wireless communication device according to (8), in which
the frame construction unit constructs an A-MPDU frame for retransmission as the data to be transmitted through a frequency band that has entered an available state.

(13)
The wireless communication device according to any one of (1) to (12), in which
the communication control unit causes transmission of a request for the receipt acknowledgment information.

(14)
The wireless communication device according to any one of (1) to (13), in which
the communication control unit causes retransmission of the data that has not arrived, the data being of the data transmitted through in the plurality of frequency bands.

(15)
A wireless communication method implemented in a wireless communication device,
the wireless communication method including:
setting a series of sequence numbers to data to be transmitted to one transmission destination through a plurality of frequency bands;
transmitting the data through the plurality of frequency bands; and
causing reception of receipt acknowledgment information through a frequency band in which transmission of the data has been completed first among the plurality of frequency bands, the receipt acknowledgment information indicating a receipt acknowledgment regarding the data transmitted through the plurality of frequency bands.

(16)
A wireless communication device including:
a wireless reception unit that receives data transmitted to one transmission destination through a plurality of frequency bands;
a sequence management unit that manages a series of sequence numbers that have been set to the data received through the plurality of frequency bands; and
a communication control unit that causes transmission of receipt acknowledgment information through a frequency band in which reception of the data has been completed first, the receipt acknowledgment information indicating a receipt acknowledgment regarding the data received through the plurality of frequency bands.

(17)
The wireless communication device according to (16), in which
the sequence management unit determines a priority level of the data, in accordance with information indicating a position of the data in a data group having the same priority level, the information having been added to the data received through the plurality of frequency bands.

(18)
The wireless communication device according to (16) or (17), further including
an output management unit that outputs the received data, in accordance with the information indicating the position of the data.

(19)
A wireless communication method implemented in a wireless communication device,
the wireless communication method including:
receiving data transmitted to one transmission destination through a plurality of frequency bands;
managing a series of sequence numbers that have been set to the data received through the plurality of frequency bands; and
causing transmission of receipt acknowledgment information through a frequency band in which reception of the data has been completed first, the receipt acknowledgment information indicating a receipt acknowledgment regarding the data received through the plurality of frequency bands.

REFERENCE SIGNS LIST 11, 11-1 to 11-4 Communication device
51 Network connection module
52 Information input module
53 Device control module
54 Information output module
55 Wireless communication module
101 Interface
102 Priority level determination unit
103 Transmission buffer
104 Operation control unit
105 Transmission sequence management unit
106 Communication control unit
107 Frame construction unit
108 Access control unit
109, 109-1 to 109-5 High-frequency processing unit
110 Frame analysis unit
111 Reception sequence management unit
112 Reception buffer
113 Output sequence management unit

The invention claimed is:

1. A wireless communication device comprising:
a transceiver; and
circuitry that:
performs a data element setting that sets a first series of sequence numbers to each data element of a first data stream, a second series of sequence numbers to each data element of a second data stream and a third series of sequence numbers to each data element of a third data stream to be transmitted to one transmission destination,
wherein each data element of the first data stream has a first priority, each data element of the second data stream has a second priority different from the first priority, each data element of the third data stream has a third priority different from the first and second priorities;
performs a sequential transmission of the first and second data streams to the one transmission destination through first through third frequency bands of a plurality of frequency bands;
transmits a request for receipt acknowledgment information only through a specific frequency band of the first through third frequency bands in which the corresponding sequential transmission is expected to be completed first, the request transmitted after the corresponding sequential transmission has completed, and before completion of the corresponding transmissions on each of the plurality of frequency bands other than the specific frequency band; and
receives the receipt acknowledgment information via the specific frequency band, the receipt acknowledgment information indicating a receipt acknowledgment regarding the data transmitted through the specific frequency band.

2. The wireless communication device according to claim 1, wherein
the sequential transmission of the first through third data streams through the first through third frequency bands comprises sequential transmission of the first through third data streams through respective ones of the first through third frequency bands.

3. The wireless communication device according to claim 1, wherein,
the sequential transmission of the first through third data streams through the first through third frequency bands comprises sequential transmission of the first through third data streams through all of the first through third frequency bands of the plurality of frequency bands based on data element priority and frequency band availability.

4. The wireless communication device according to claim 3, wherein
the data element setting sets information indicating a position of each data element data in a respective one of the first through third series of sequence numbers, the position being one of a sequence start position, a sequence end position or a sequence intermediate position.

5. The wireless communication device according to claim 2, wherein,
the data element setting sets information indicating a position of each data element data in a respective one of the first through third series of sequence numbers, the position being one of a sequence start position, a sequence end position or a sequence intermediate position.

6. The wireless communication device according to claim 1, wherein,
the data element setting sets information indicating a position of each data element data in a respective one of the first through third series of sequence numbers, the position being one of a sequence start position, a sequence end position or a sequence intermediate position.

7. The wireless communication device according to claim 1, wherein the
each sequential transmission of the first through third data streams to the one transmission destination through the first through third frequency bands includes performing the transmission after a predetermined wait time from when an access right is acquired and after any channel busy period that may occur before a beginning of the predetermined wait time from when the access right is acquired.

8. The wireless communication device according to claim 1, wherein the receipt acknowledgment information received via the specific frequency band includes information identifying any corresponding data elements that were transmitted via the specific frequency band that were not received correctly.

9. The wireless communication device according to claim 1, wherein the circuitry:
after receiving the receipt acknowledgment information via the specific frequency band, automatically receives a block acknowledgment from each of the plurality of frequency bands other than the specific frequency band, the block acknowledgment indicating an end of a corresponding sequential transmission and identifying any corresponding data elements that were not received correctly, and
retransmits at least one of the data elements that were not received correctly on the second specific frequency band via the specific frequency band.

10. The wireless communication device according to claim 1, wherein the circuitry:
after receiving the receipt acknowledgment information via the specific frequency band, automatically receives a block acknowledgment from each of the plurality of frequency bands other than the specific frequency band, the block acknowledgment indicating an end of a corresponding sequential transmission and identifying any corresponding data elements that were not received correctly, and retransmits at least one of the data elements that were not received correctly on each of the second and third specific frequency band via the specific frequency band in priority order.

11. The wireless communication device according to claim 1, wherein the circuitry:

after receiving the receipt acknowledgment information via the specific frequency band, automatically receives a block acknowledgment from each of the plurality of frequency bands other than the specific frequency band, the block acknowledgment indicating an end of a corresponding sequential transmission and identifying any corresponding data elements that were not received correctly, and retransmits at least one of the data elements that were not received correctly on each of the second and third specific frequency band via the specific frequency band in an order corresponding to an original data element transmission time.

12. A wireless communication method performed by a wireless communication device, the wireless communication method comprising:

performing a data element setting that sets a first series of sequence numbers to each data element of a first data stream, a second series of sequence numbers to each data element of a second data stream and a third series of sequence numbers to each data element of a third data stream to be transmitted to one transmission destination, wherein each data element of the first data stream has a first priority, each data element of the second data stream has a second priority different from the first priority, each data element of the third data stream has a third priority different from the first and second priorities;

performing a sequential transmission of the first and second data streams to the one transmission destination through first through third frequency bands of a plurality of frequency bands;

transmitting a request for receipt acknowledgment information only through a specific frequency band of the first through third frequency bands in which the corresponding sequential transmission is expected to be completed first, the request transmitted after the corresponding sequential transmission has completed, and before completion of the corresponding transmissions on each of the plurality of frequency bands other than the specific frequency band; and receiving the receipt acknowledgment information via the specific frequency band, the receipt acknowledgment information indicating a receipt acknowledgment regarding the data transmitted through the specific frequency band.

13. A non-transitory computer product containing instructions for a wireless communication method to be performed by a wireless communication device, the wireless communication method comprising:

performing a data element setting that sets a first series of sequence numbers to each data element of a first data stream, a second series of sequence numbers to each data element of a second data stream and a third series of sequence numbers to each data element of a third data stream to be transmitted to one transmission destination, wherein each data element of the first data stream has a first priority, each data element of the second data stream has a second priority different from the first priority, each data element of the third data stream has a third priority different from the first and second priorities;

performing a sequential transmission of the first and second data streams to the one transmission destination through first through third frequency bands of a plurality of frequency bands;

transmitting a request for receipt acknowledgment information only through a specific frequency band of the first through third frequency bands in which the corresponding sequential transmission is expected to be completed first, the request transmitted after the corresponding sequential transmission has completed, and before completion of the corresponding transmissions on each of the plurality of frequency bands other than the specific frequency band; and receiving the receipt acknowledgment information via the specific frequency band, the receipt acknowledgment information indicating a receipt acknowledgment regarding the data transmitted through the specific frequency band.

* * * * *